United States Patent
Largman et al.

(10) Patent No.: US 7,137,034 B2
(45) Date of Patent: Nov. 14, 2006

(54) SELF REPAIRING COMPUTER HAVING USER ACCESSIBLE SWITCH FOR MODIFYING BOOTABLE STORAGE DEVICE CONFIGURATION TO INITIATE REPAIR

(75) Inventors: Kenneth Largman, San Francisco, CA (US); Anthony B. More, Oakland, CA (US); Jeffrey Blair, San Francisco, CA (US)

(73) Assignee: Vir2us, Inc., Sausalito, CA (US)

( * ) Notice: Subject to any disclaimer, the term of this patent is extended or adjusted under 35 U.S.C. 154(b) by 318 days.

(21) Appl. No.: 10/094,600

(22) Filed: Mar. 6, 2002

(65) Prior Publication Data

US 2002/0169998 A1 Nov. 14, 2002

Related U.S. Application Data

(63) Continuation-in-part of application No. 10/090,480, filed on Feb. 27, 2002, and a continuation-in-part of application No. 10/074,686, filed on Feb. 11, 2002, and a continuation-in-part of application No. 10/075,136, filed on Nov. 19, 2001, and a continuation-in-part of application No. 09/862,898, filed on May 21, 2001, now Pat. No. 6,880,110.

(60) Provisional application No. 60/291,767, filed on May 17, 2001.

(51) Int. Cl.
*G06F 11/00* (2006.01)
(52) U.S. Cl. ............................ 714/23; 714/36; 713/100
(58) Field of Classification Search ................. 714/23, 714/36, 57; 713/2, 100, 3
See application file for complete search history.

(56) References Cited

U.S. PATENT DOCUMENTS 4,464,747 A 8/1984 Groudan et al.

(Continued)

FOREIGN PATENT DOCUMENTS

CA 2197502 A1 8/1998

(Continued)

OTHER PUBLICATIONS

Collection of printouts from GreenBorder website. ©2004-2006 GreenBorder Technologies, Inc., www.greenborder.com, Jan. 27, 2006, 36 pgs.

(Continued)

*Primary Examiner*—Robert Beausoliel
*Assistant Examiner*—Christopher McCarthy
(74) *Attorney, Agent, or Firm*—Perkins Coie LLP; R. Michael Ananian

(57) ABSTRACT

A method or system for supporting a computer systems self repair, including the computer executed steps for booting from a first boot device, and booting from a second boot device in response to a signal indicating a need for repair. While booted from the second boot device the computer system is capable of repairing software on the first boot device. The signal may effect a logical or physical switch. Repairing software may be performed in part by copying, template, backup or archive software from a device other than the first boot device. Repairing software may be performed automatically without direction by a user or according to preset preferences.

16 Claims, 16 Drawing Sheets

U.S. PATENT DOCUMENTS

| | | | |
|---|---|---|---|
| 4,939,694 A | 7/1990 | Eaton et al. | |
| 5,434,562 A | 7/1995 | Reardon | |
| 5,655,069 A | 8/1997 | Ogawara et al. | |
| 5,704,031 A | 12/1997 | Mikami et al. | |
| 5,732,268 A | 3/1998 | Bizzarri | |
| 5,737,118 A | 4/1998 | Sugaya et al. | |
| 5,764,878 A | 6/1998 | Kablanian et al. | |
| 5,826,012 A | 10/1998 | Lettvin | |
| 5,841,712 A | 11/1998 | Wendell et al. | |
| 5,860,001 A * | 1/1999 | Cromer et al. | 713/1 |
| 5,920,515 A | 7/1999 | Shaik et al. | |
| 6,016,553 A | 1/2000 | Schneider et al. | |
| 6,067,618 A | 5/2000 | Weber | |
| 6,088,794 A * | 7/2000 | Yoon et al. | 713/2 |
| 6,178,452 B1 | 1/2001 | Miyamoto | |
| 6,199,178 B1 | 3/2001 | Schneider et al. | |
| 6,205,527 B1 * | 3/2001 | Goshey et al. | 711/162 |
| 6,289,426 B1 | 9/2001 | Maffezzoni et al. | |
| 6,301,657 B1 * | 10/2001 | Jones et al. | 713/2 |
| 6,317,845 B1 | 11/2001 | Meyer et al. | |
| 6,327,653 B1 * | 12/2001 | Lee | 713/100 |
| 6,347,375 B1 | 2/2002 | Reinert et al. | |
| 6,367,042 B1 | 4/2002 | Phan et al. | |
| 6,374,366 B1 * | 4/2002 | Maffezzoni | 714/27 |
| 6,381,694 B1 * | 4/2002 | Yen | 713/2 |
| 6,421,792 B1 * | 7/2002 | Cromer et al. | 714/36 |
| 6,754,818 B1 * | 6/2004 | Lee et al. | 713/2 |
| 2002/0087855 A1 * | 7/2002 | Dykes et al. | 713/2 |
| 2004/0083369 A1 | 4/2004 | Erlingsson et al. | |
| 2004/0268361 A1 | 12/2004 | Schaefer | |
| 2005/0010670 A1 | 1/2005 | Greschler et al. | |
| 2005/0060722 A1 | 3/2005 | Rochette et al. | |
| 2005/0149726 A1 | 7/2005 | Joshi et al. | |
| 2006/0020858 A1 | 1/2006 | Schaefer | |
| 2006/0020937 A1 | 1/2006 | Schaefer | |

FOREIGN PATENT DOCUMENTS

| | | |
|---|---|---|
| EP | 0 978 785 A1 | 2/2000 |
| WO | WO 95/22794 A1 | 8/1995 |
| WO | WO 01/11449 A1 | 2/2001 |
| WO | WO 03/073208 A2 | 9/2003 |
| WO | WO 03/073208 A3 | 9/2003 |
| WO | WO 03/075158 A2 | 9/2003 |
| WO | WO 2003/075158 A3 | 9/2003 |
| WO | WO 03/096169 A2 | 11/2003 |
| WO | WO 2003/096169 A2 | 11/2003 |
| WO | WO 03/104954 A2 | 12/2003 |
| WO | WO 2003/104954 A3 | 12/2003 |
| WO | WO 2004/012416 A2 | 2/2004 |
| WO | WO 2004/012416 A3 | 2/2004 |
| WO | WO 2005/043360 A1 | 5/2005 |

OTHER PUBLICATIONS

"Whitepaper: iSolation Server v.2," 2005, Avinti, Inc., Lindon, UT, 15 pgs.

* cited by examiner

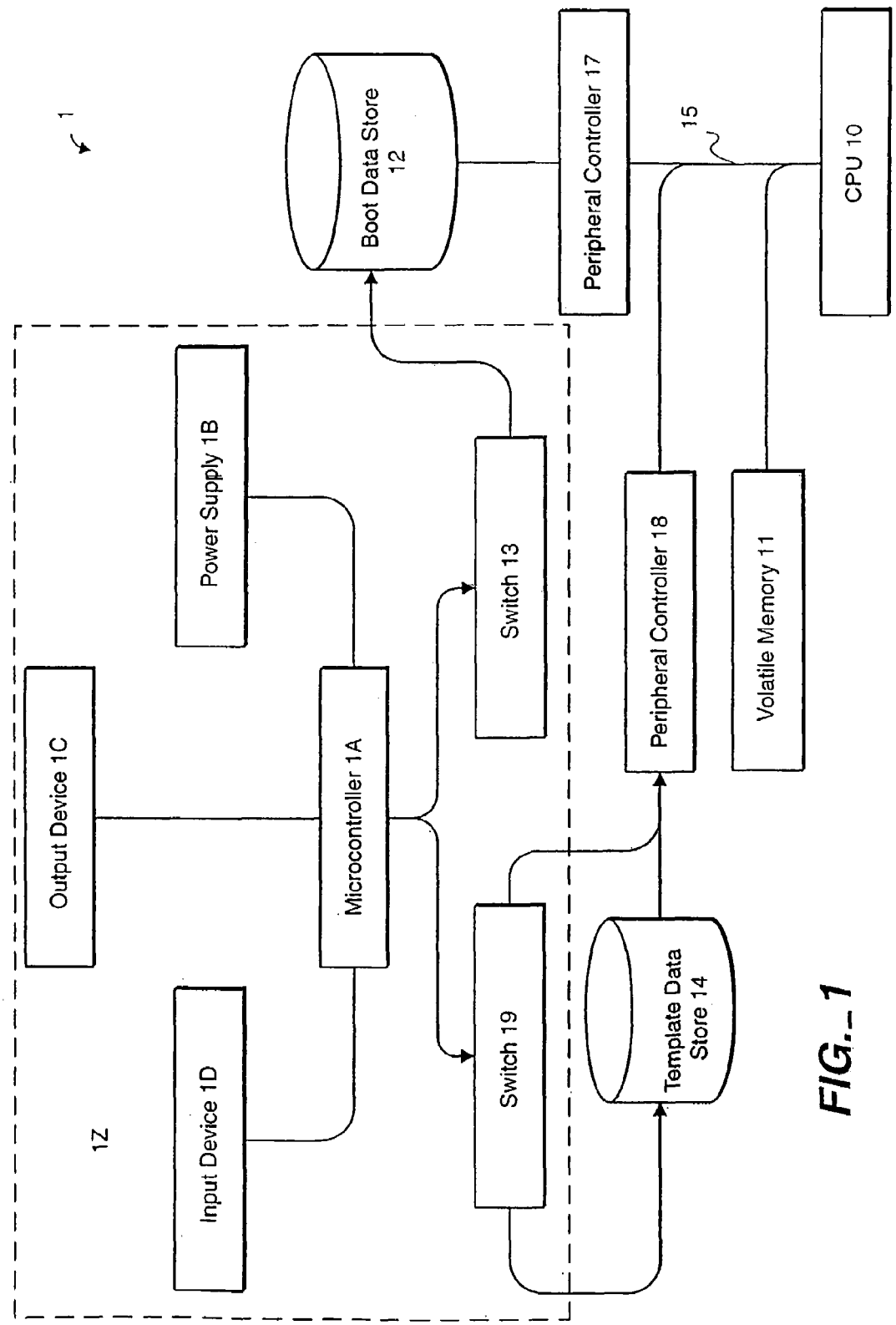
FIG._1

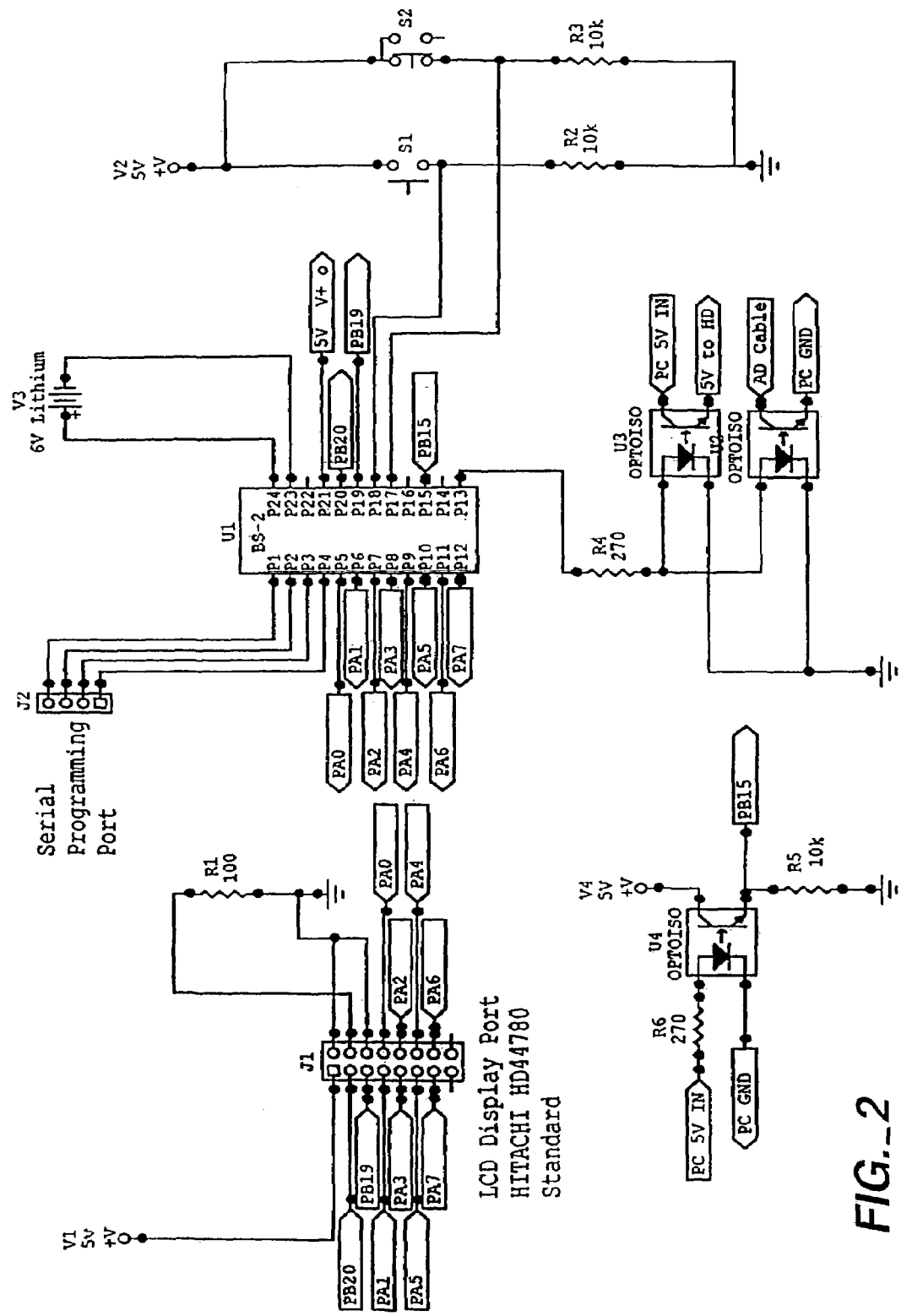
FIG._2

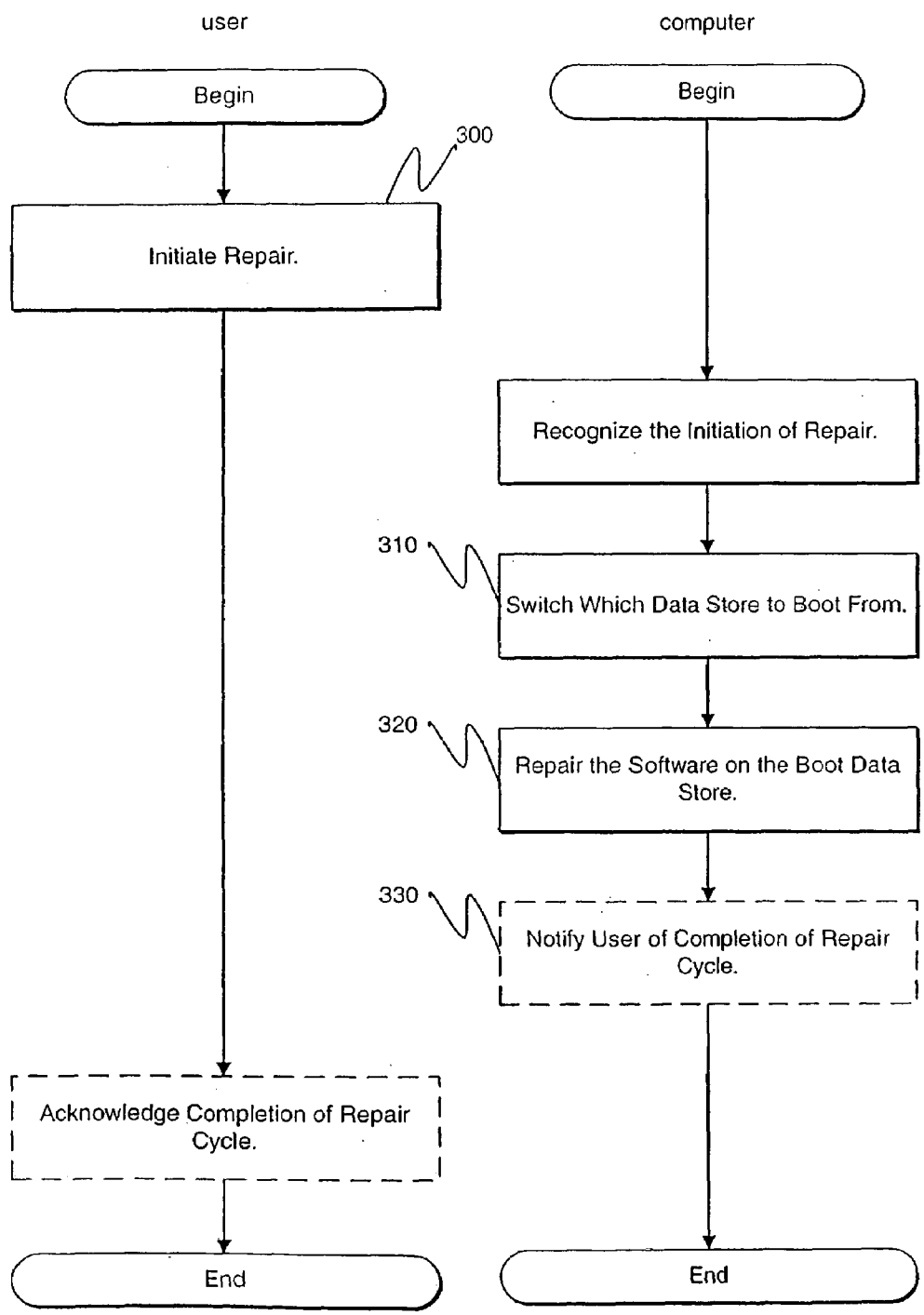
FIG._3A  FIG._3B

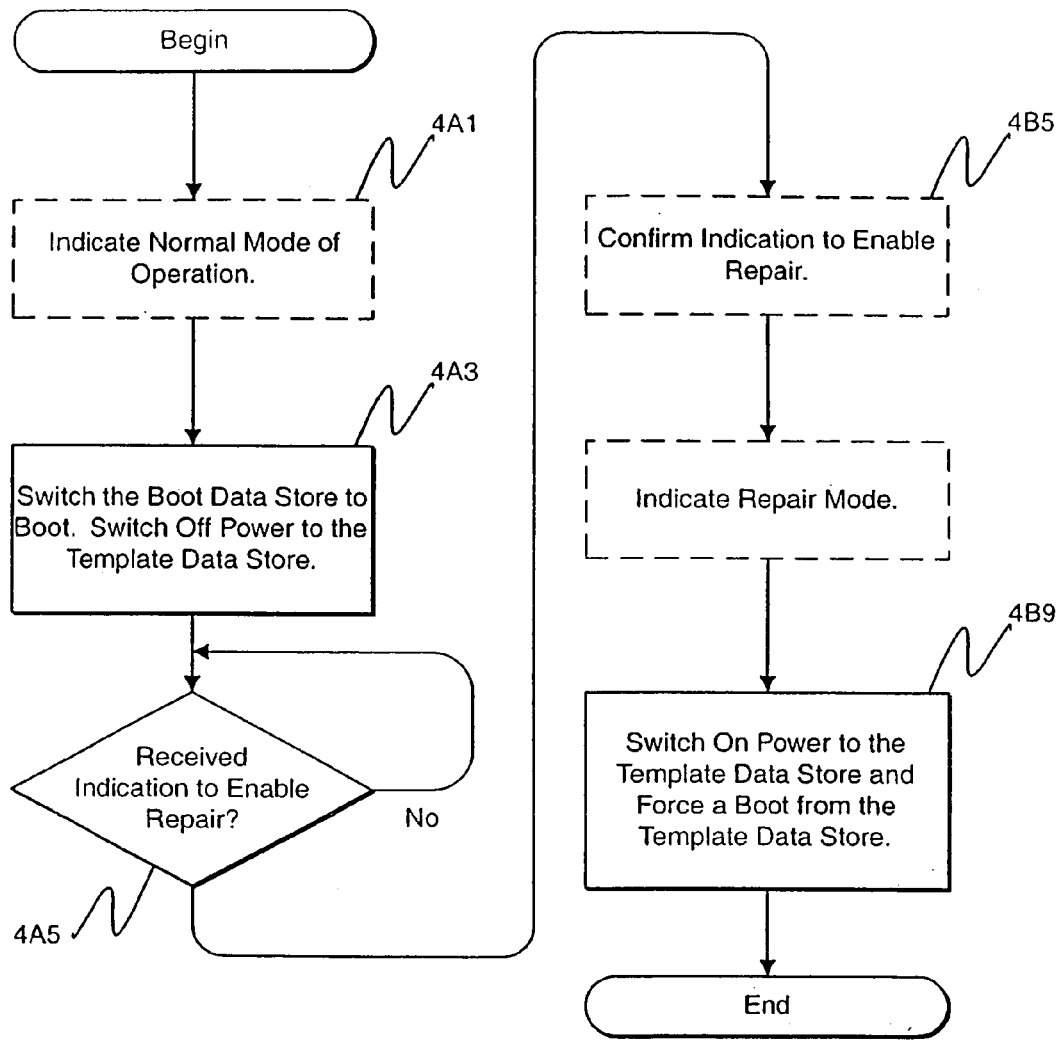
FIG._4

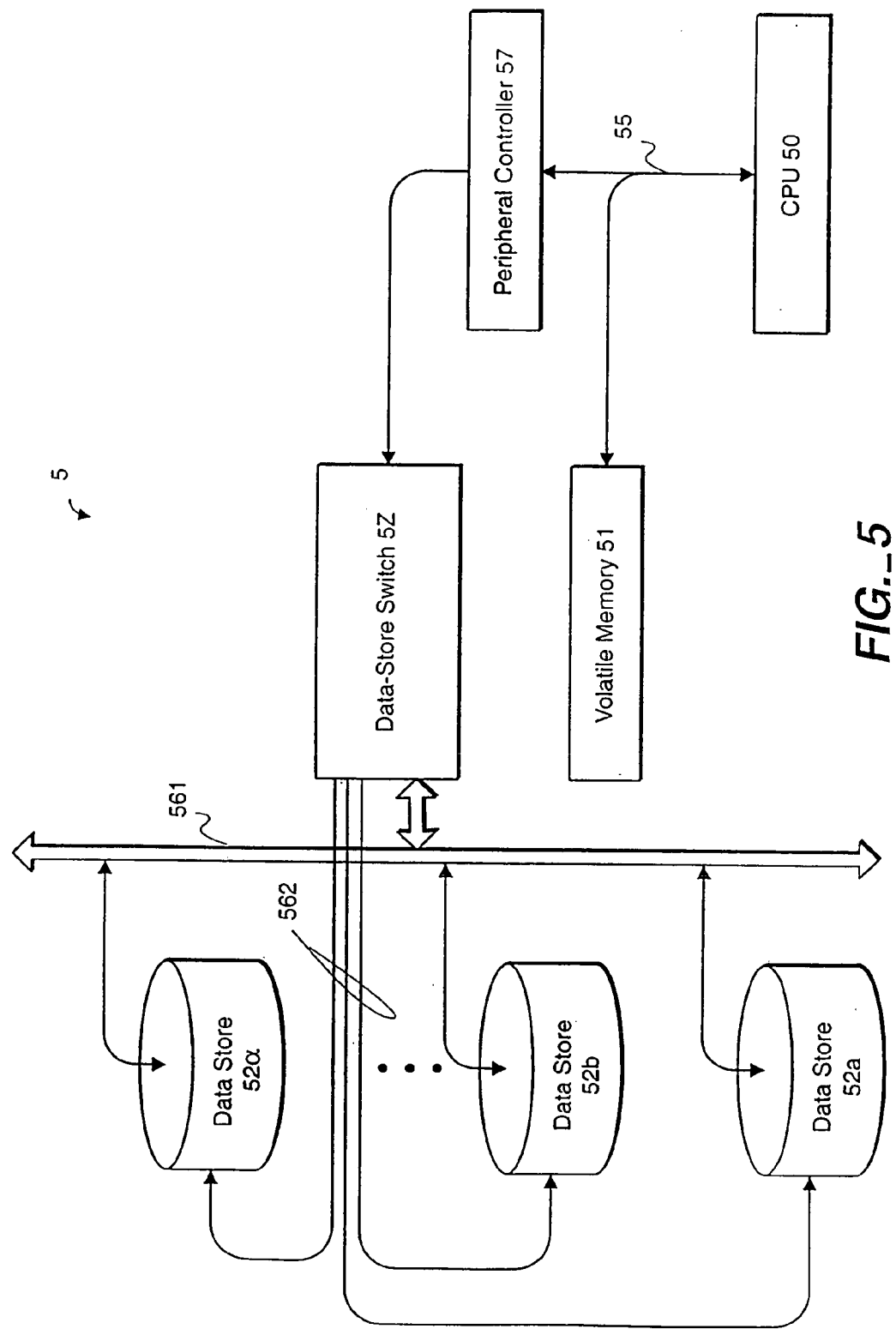
FIG._5

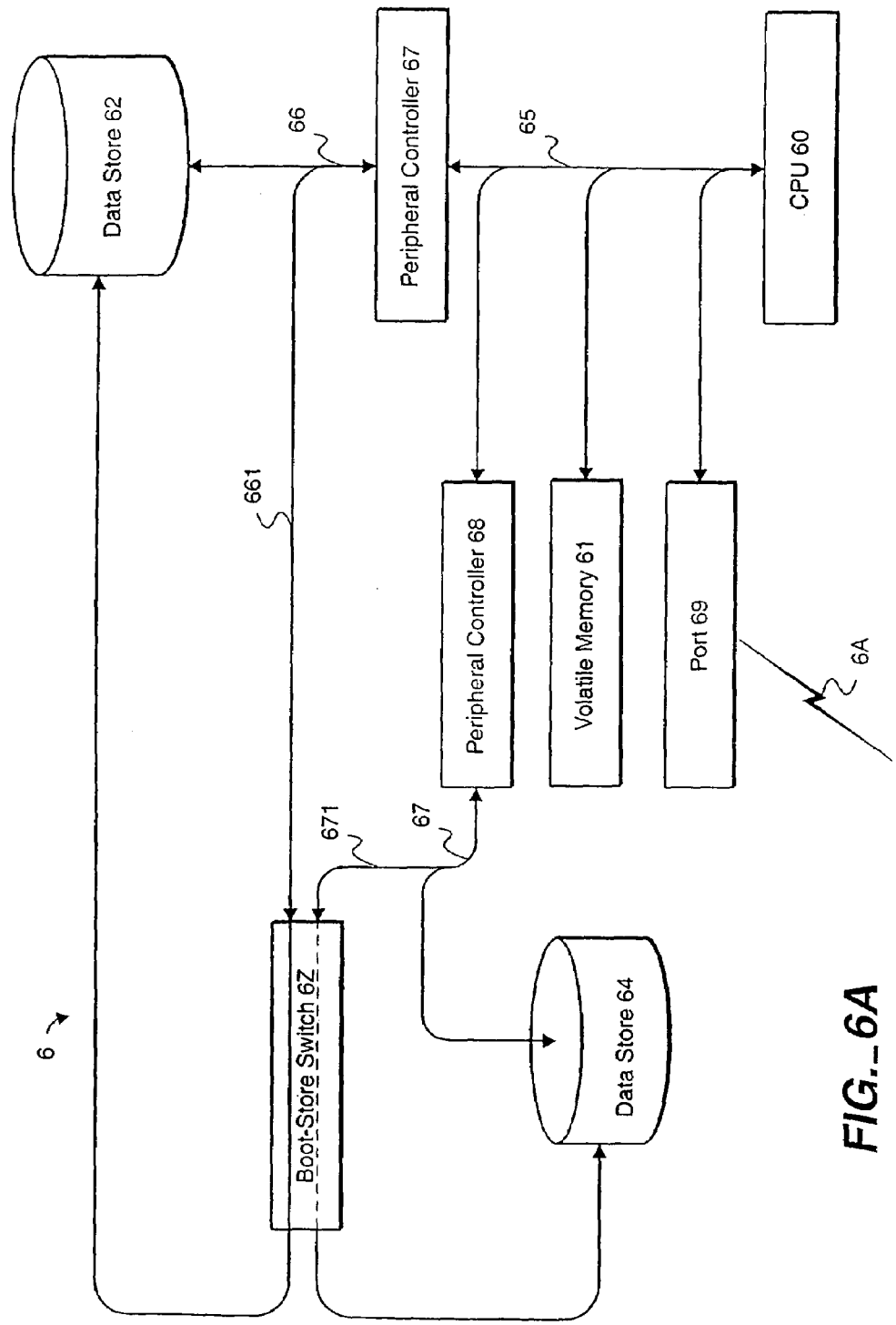
FIG._6A

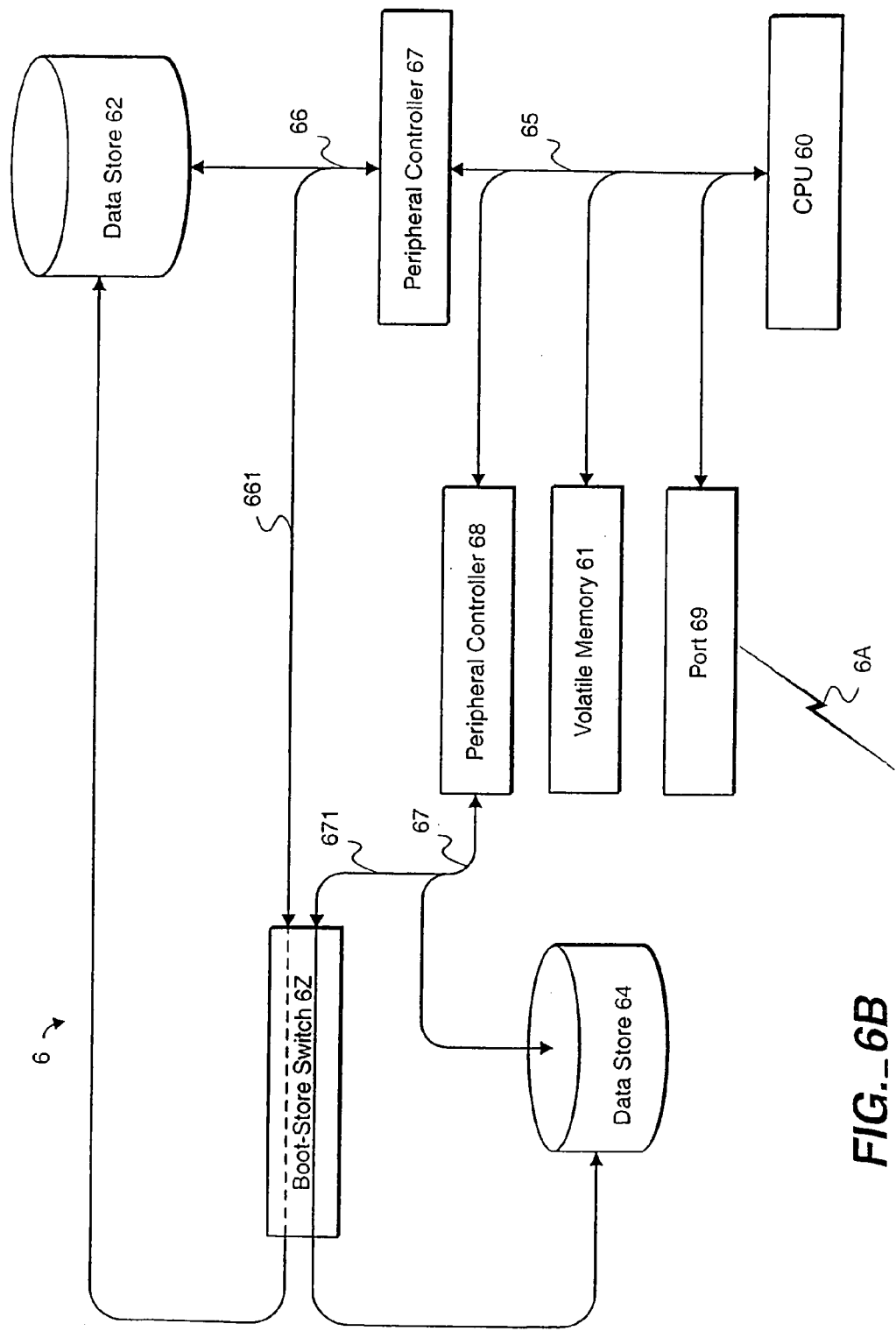
FIG._6B

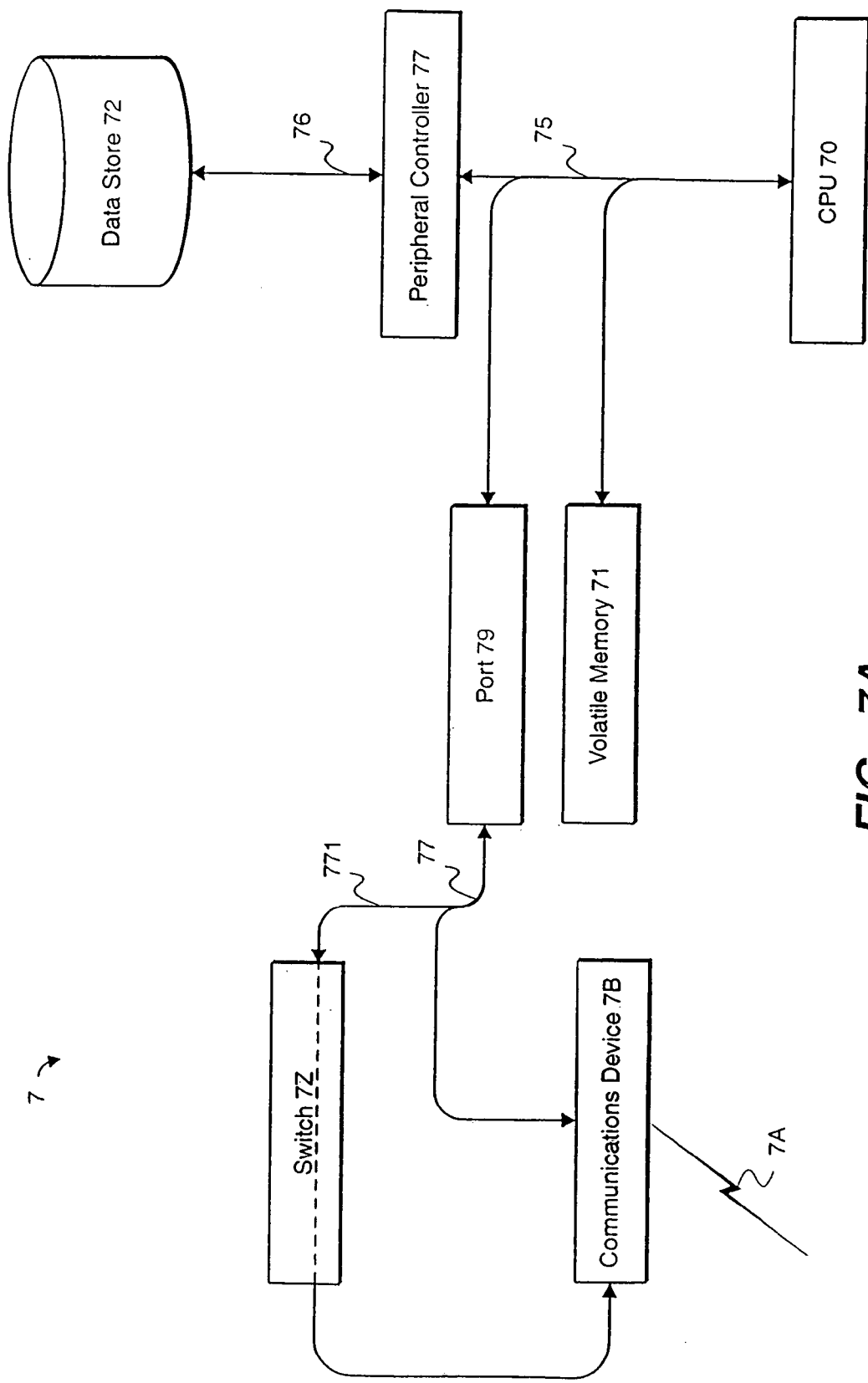
FIG._7A

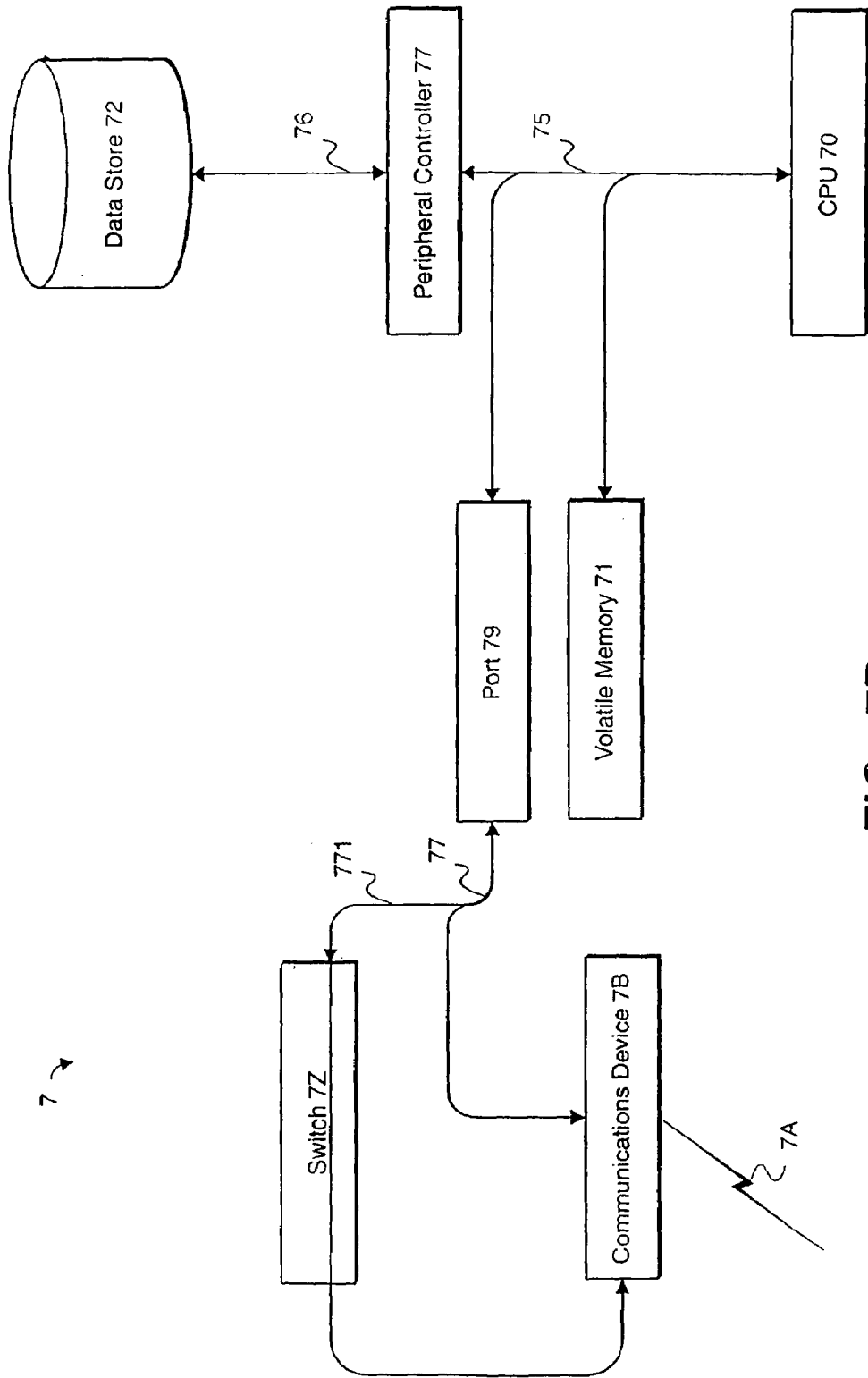
FIG._7B

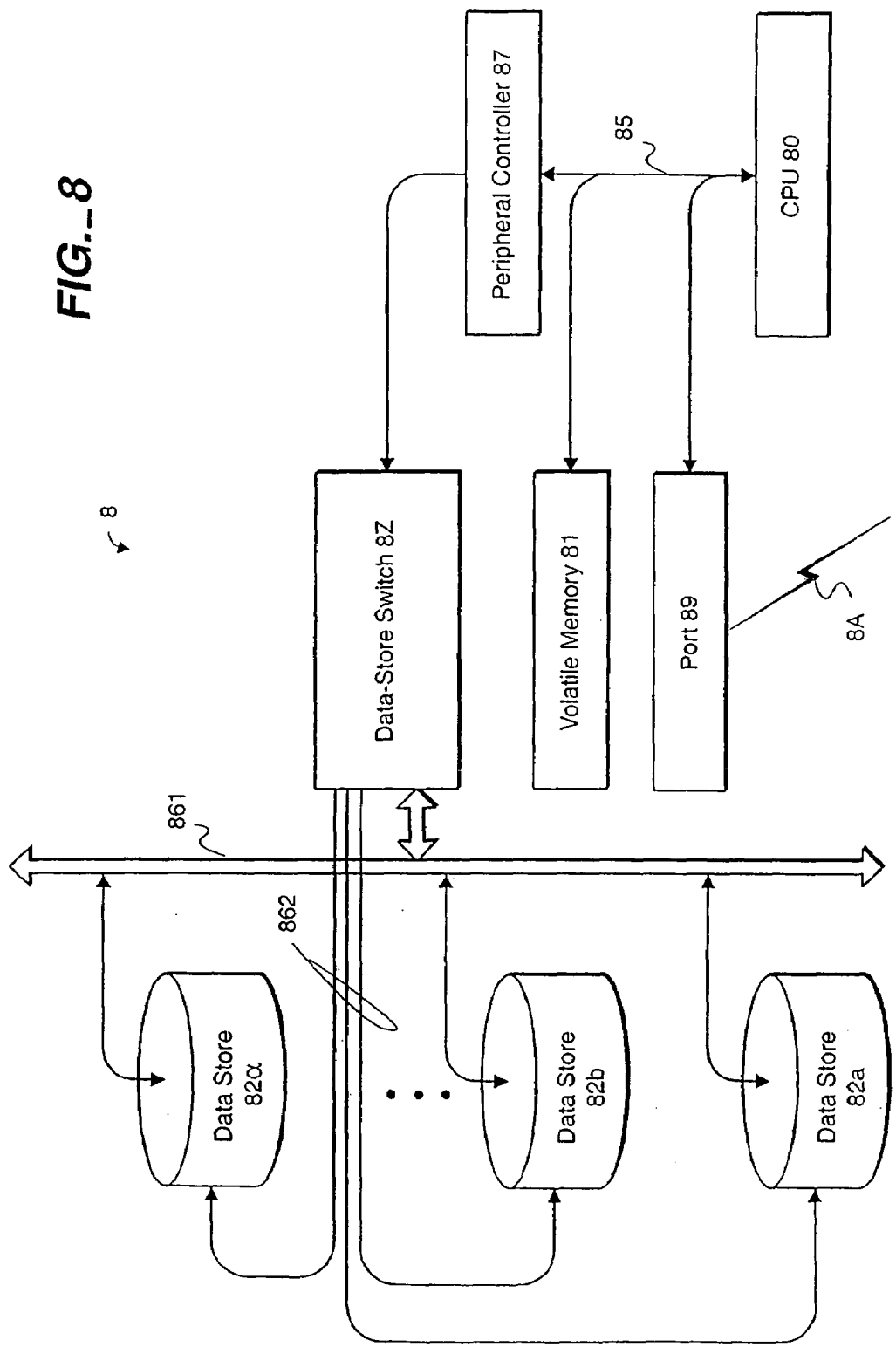
FIG._8

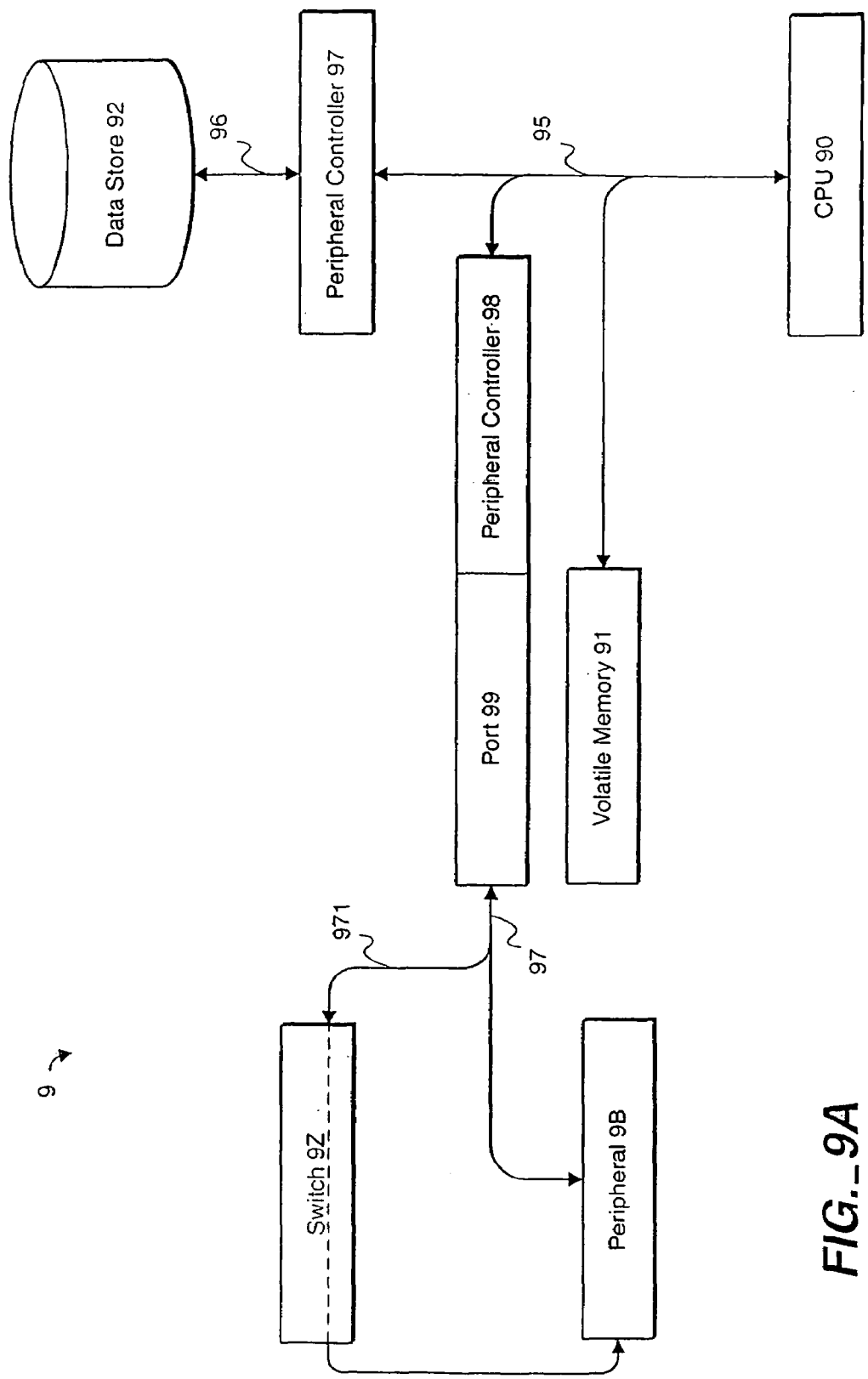
FIG._9A

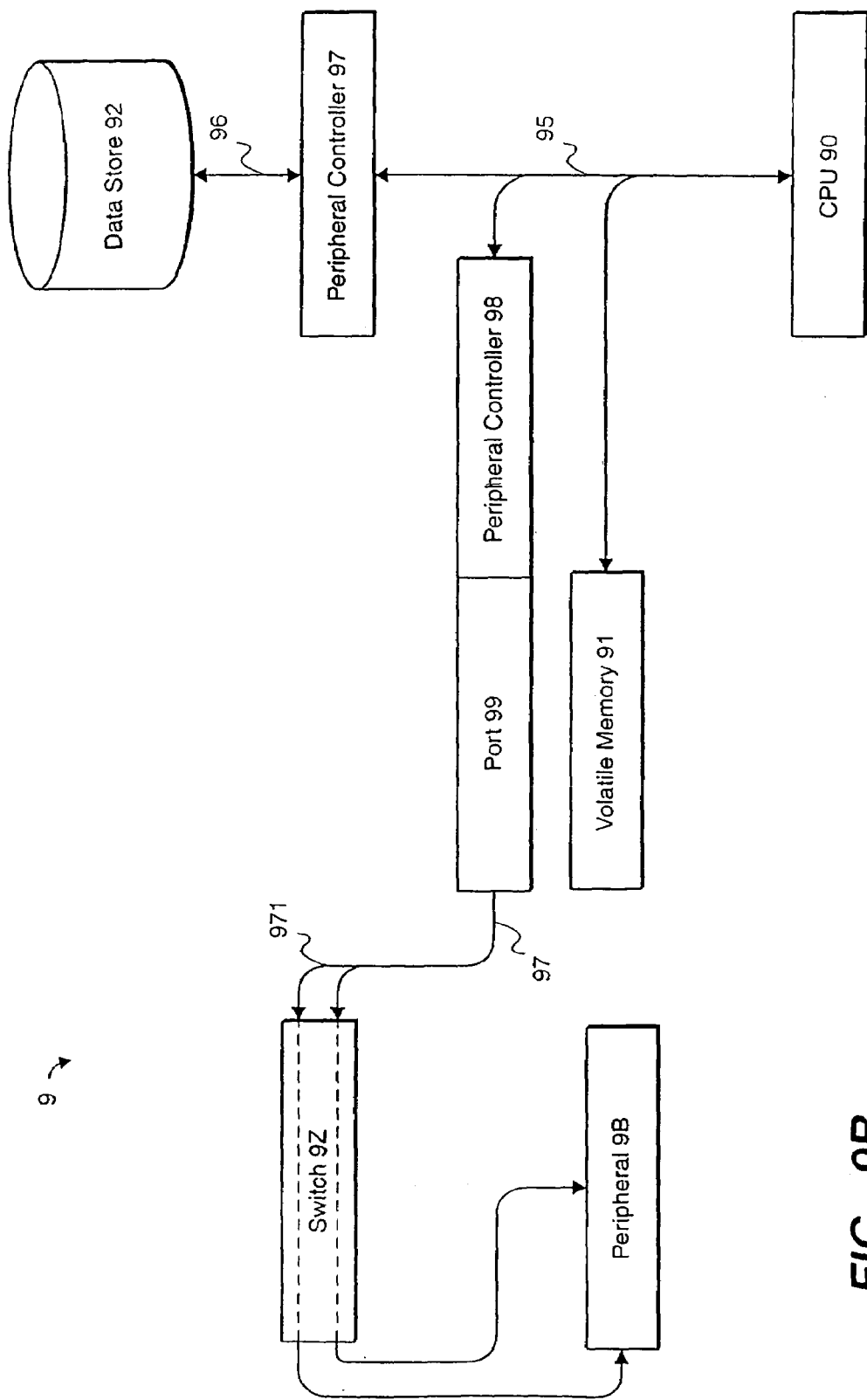
FIG._9B

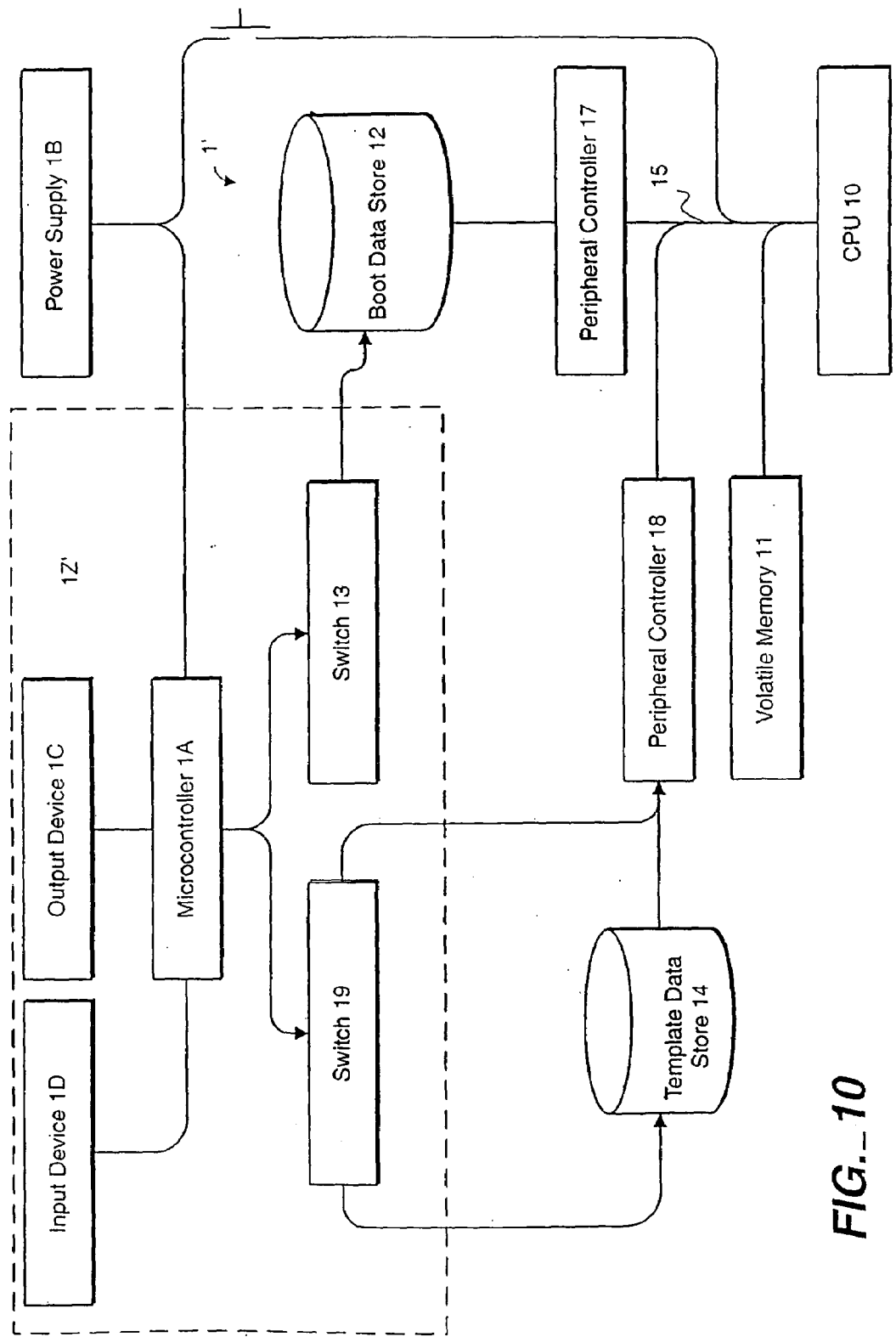
FIG._10

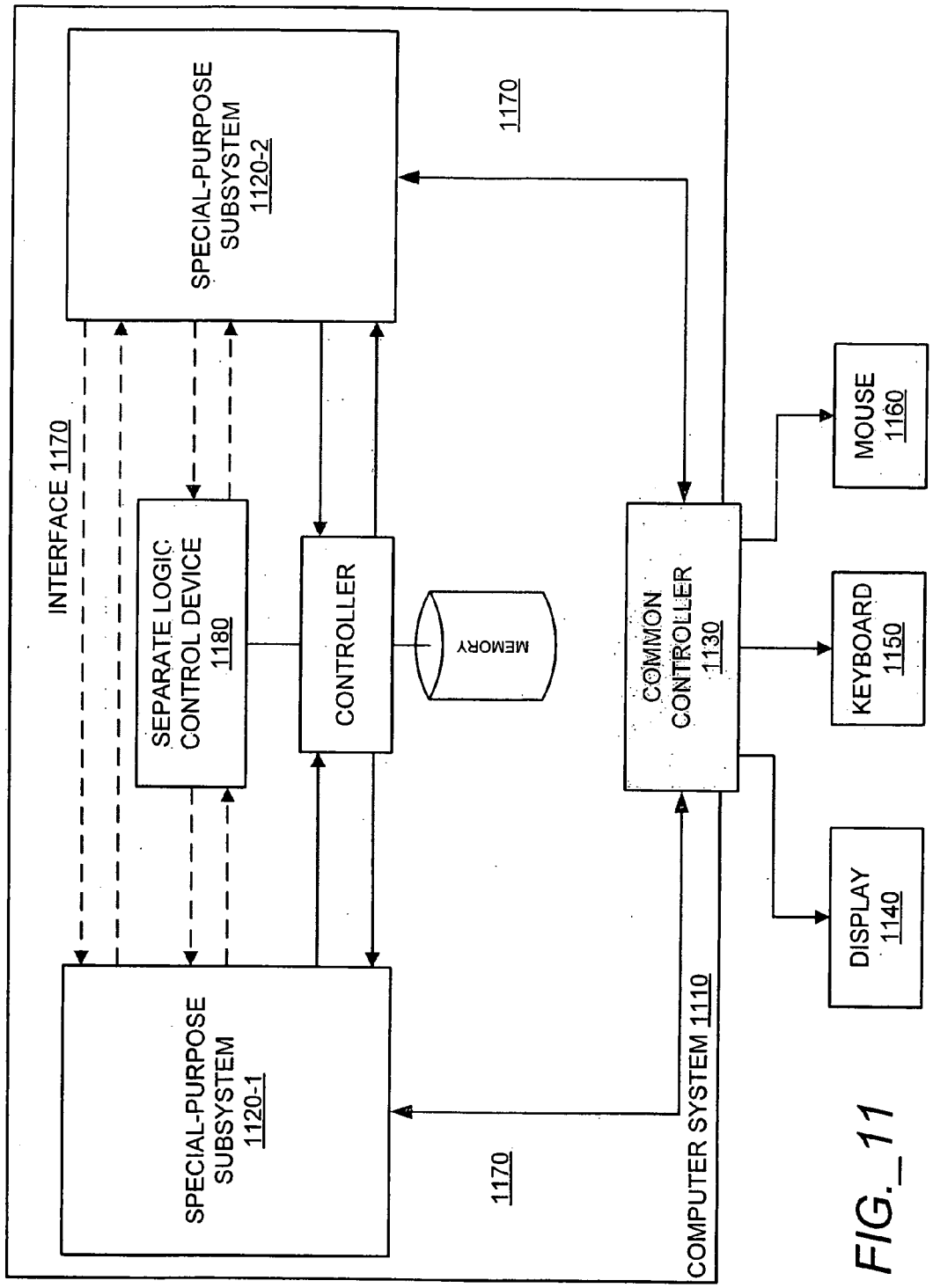
FIG._11

SELF REPAIRING COMPUTER HAVING USER ACCESSIBLE SWITCH FOR MODIFYING BOOTABLE STORAGE DEVICE CONFIGURATION TO INITIATE REPAIR

BENEFIT APPLICATIONS

This application is a continuation-in-part and claims the benefit of priority under 35 U.S.C. 119(e) and/or 35 U.S.C. 120 to:

U.S. patent application Ser. No. 09/862,898, entitled, "A Computer with Switchable Components," filed May 21, 2001, naming Kenneth Largman and Anthony B. More and Jeffrey Blair as inventors, and commonly assigned to Self Repairing Computers, Inc., San Francisco, Calif.;

U.S. patent application Ser. No. 10/075,136, entitled, "On-The-Fly Repair Of A Computer," filed Nov. 19, 2001, naming Kenneth Largman and Anthony B. More and Jeffrey Blair as inventors, and under an obligation of assignment to Self Repairing Computers, Inc., San Francisco, Calif.;

U.S. patent application Ser. No. 10/074,686, entitled, "External Repair Of A Computer," filed Feb. 11, 2002, naming Kenneth Largman and Anthony B. More and Jeffrey Blair as inventors, and under an obligation of assignment to Self Repairing Computers, Inc., San Francisco, Calif.;

U.S. patent application Ser. No. 10/090,480, entitled, "Backup Of A Computer," filed Feb. 27, 2002, naming Kenneth Largman and Anthony B. More and Jeffrey Blair as inventors, and under an obligation of assignment to Self Repairing Computers, Inc., San Francisco, Calif.;

U.S. Provisional Patent Application No. 60/291,767, entitled, "A Self-Repairing Computer," filed May 17, 2001, naming Kenneth Largman and Anthony B. More as inventors, and commonly assigned to Self Repairing Computers, Inc., San Francisco, Calif.;

U.S. Provisional Patent Application No. 60/205,531, entitled, "Scalable, Diagnostic, Repair and Multi-Use System for Computing Hardware & Devices that Utilize Computer Hardware," filed May 19, 2000, naming Kenneth Largman and Anthony More as inventors, and commonly assigned to Self-Repairing Computers, Inc. of San Francisco, Calif.; and U.S. Provisional Patent Application No. 60/220,282, entitled, "Scalable, Diagnostic, Repair and Multi-Use System for Computing Hardware & Devices That Utilize Computer Hardware," filed Jul. 24, 2000, naming Kenneth Largman and Anthony More as inventors, and commonly assigned to Self-Repairing Computers, Inc. of San Francisco, Calif.; each of which applications are incorporated herein by reference.

FIELD OF THE INVENTION

This invention relates to computers, computer repair and computer architecture. More particularly, the invention relates to a computer architecture and software that enables the computer to repair itself.

BACKGROUND

Personal-computer manufacturers and sellers often offer via-telephone and on-site repair services. Yet purchasers—particularly home, home-office and small-office purchasers—readily complain that their service contract offers less service than they expected. For example, a computer seller may dispatch a technician only after the purchaser calls the help center, performs a number of tests under the direction of the help center, escalates the problem at the telephone help center and performs redundant or additional tests under the direction of a putatively more knowledgeable telephone-help staff. The purchaser may have to escalate the problem still further and perform additional redundant tests before a repair technician is dispatched.

Frequently, the help center directs the customer to cycle the power on the computer, to re-boot the computer, to detach and reattach peripherals in question and to re-install application and operating-system software. Each call to the help center and each level of escalation may require the purchaser to cycle, re-boot, detach and reattach.

Detaching and reattaching peripherals can be extremely inconvenient. USB devices, for example, typically attach at the back of a computer in a location difficult to reach. In any event, the non-digerati purchaser may fear disassembling his computer, worrying that he may damage the computer further.

Help centers even direct a customer to reformat the boot drive of the computer and re-install operating-system and application software. Re-formatting is an onerous task for several reasons. Firstly, the home, home-office and small-office user rarely reformats a drive in the normal operation of his computer and is unfamiliar with the process itself. Secondly, reformatting destroys all the data on the drive, and such a user understandably becomes anxious on finding out that he will lose all of his data. Thirdly, such a user may not retain the application or operating-system installation media, especially where the seller pre-installs the software. The user may have been unsure which media to keep, or intending to keep a particular media, is in fact unable to locate that media later when needed.

Fourthly, the user typically does not back up his drives as often as an information technologist would recommend. That he will have to rely on his back ups (if any) if he is to have any hope of restoring his application is then not a comforting thought.

Accordingly, the art evinces a need for a computer that reduces or even eliminates the need for a user to call a help line, to keep installation media, to attach and reattach peripherals at the port, etc. Indeed, a computer that reduces or eliminates the technical savvy its user needs to effect repairs is desirable.

These and other goals of the invention will be readily apparent to one of ordinary skill in the art on reading the background above and the description below.

BRIEF DESCRIPTION OF THE DRAWINGS

FIG. 1 illustrates a computer incorporating an embodiment of the invention.

FIG. 2 is a schematic of a data-store switch according to an embodiment of the invention.

FIGS. 3A through 3B illustrate the switch-and-repair process according to one embodiment of the invention.

FIG. 4 illustrates the flow of control in a data-store switch according to one embodiment of the invention.

FIG. 5 illustrates a computer incorporating an embodiment of the invention.

FIGS. 6A, 6B illustrate a computer incorporating an embodiment of the invention. FIG. 6A illustrates the enabling of a data store in conjunction with the defeat of access to a communications link. FIG. 6B illustrates the enabling of a data store in order to support access to the communications link.

FIGS. 7A, 7B illustrate a computer incorporating an embodiment of the invention. FIG. 7A illustrates the computer in its Network Disconnected state, while FIG. 7B illustrates the computer in its Network Connected state.

FIG. 8 illustrates a computer incorporating an embodiment of the invention.

FIGS. 9A, 9B illustrate a computer incorporating embodiments of the invention.

FIG. 10 illustrates a computer incorporating an embodiment of the invention.

FIG. 11 is an illustration showing a computer with multiple special-purpose subsystems.

SUMMARY

Figure 12:
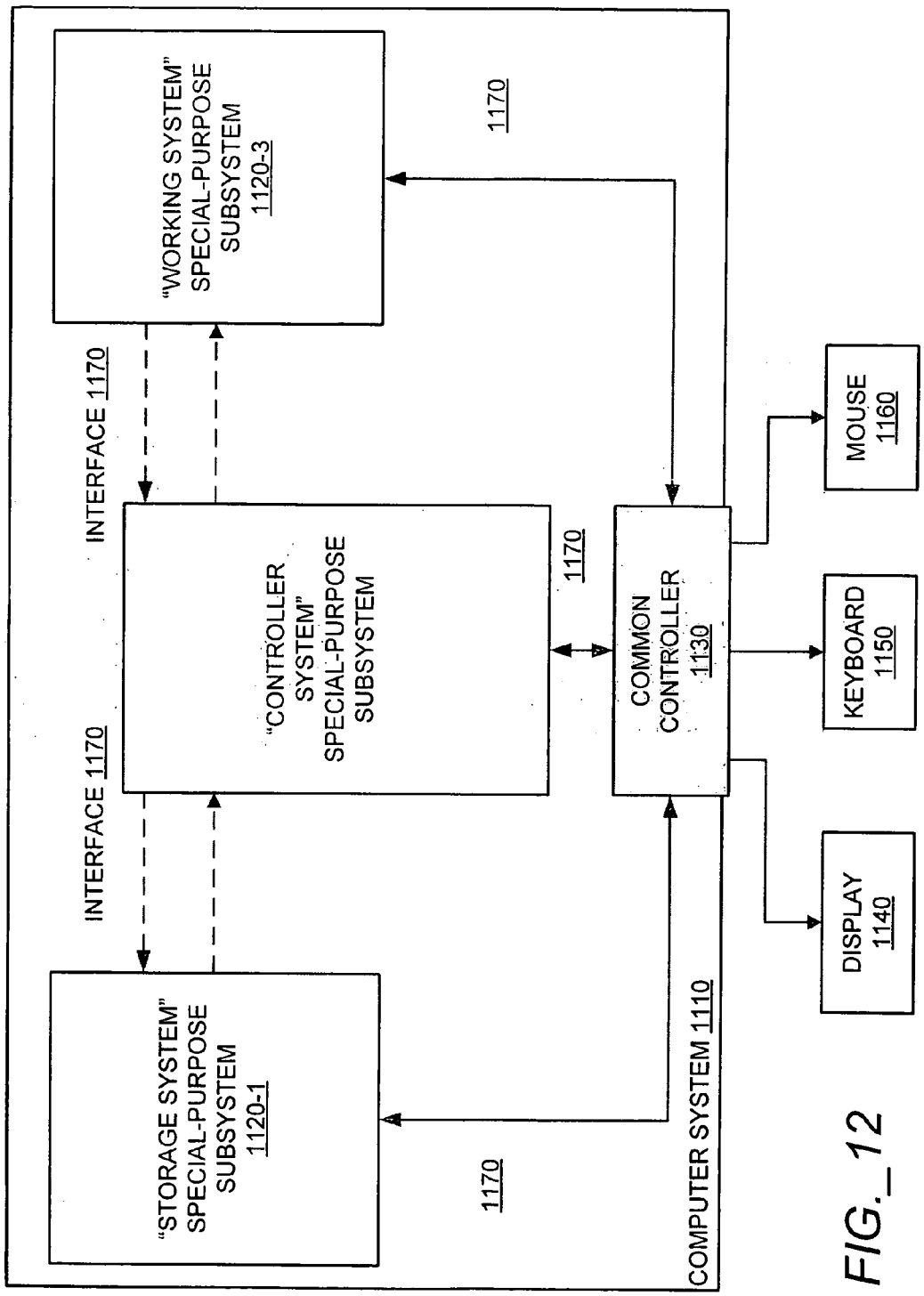
FIG. 12 is an illustration showing an alternate embodiment of a computer with multiple special-purpose subsystems including a first working system and a second storage system.

Herein are taught apparatus and methods for a computer to repair itself.

A method or system for supporting a computer systems self repair, including the computer executed steps for booting from a first boot device, and booting from a second boot device in response to a signal indicating a need for repair. While booted from the second boot device the computer system is capable of repairing software on the first boot device. The signal may effect a logical or physical switch. Repairing software may be performed in part by copying, template, backup or archive software from a device other than the first boot device. Repairing software may be performed automatically without direction by a user or according to preset preferences.

DESCRIPTION OF THE INVENTION

Overview

An example of the invention in use follows: A user runs an application on a computer incorporating an embodiment of the invention. At some point, the user modifies the application or underlying operating system to the point that the application, the operating system or both become unusable. Indeed, the user may no longer be able to even boot the operating system.

Recognizing that the computer needs to be repaired, the user throws a switch on the computer. The computer fixes the malfunctioning software and so informs the user.

The user can then re-boot the computer. On re-booting, the user again has access to a correctly functioning operating system, application and data files.

A Self-Repairing Computer

FIG. 1 illustrates a computer 1 incorporating an embodiment of the invention. The computer 1 may include a CPU 10, volatile memory 11, peripheral controllers 17, 18, a first non-volatile data store 12 and a bus 15, all well known in the art.

The computer 1 may also include switches 13, 19, a second non-volatile data store 14, a controller 1A, a power supply 1B, an output device 1C and an input device 1D.

The bus 15 may communicatively couple the volatile memory 11 and the peripheral controllers 17, 18 to each other and to the CPU 10. The peripheral controllers 17, 18 may communicatively couple with the data stores 12, 14, respectively.

The switches 13, 19, the controller 1A, power supply 1B, output device 1C and input device 1D may form a data-store switch 1Z. A data-store switch may alter the accessibility of a connected data store according to the setting of the switch.

The controller 1A may communicatively couple with the switches 13, 19, the output device 1C and the input device 1D. The power supply 1B may supply the controller 1A (and other switch components) with power. More particularly, the power supply 1B may power the controller 1A independently of the power to the rest of the computer 1.

The power to the switch 1Z may come from the same source as the power for the rest of the computer (the wall outlet or laptop battery, for example). The switch 1Z may then be powered from that supply even when the rest of the computer 1 is not. FIG. 10 illustrates this embodiment of the invention.

The switch 13 may communicate with the data store 12. The switch may control (toggle, for example) the identification settings of the data store 12.

The switch 19 may couple to the data store 14. The switch 19 may control (toggle, for example) the power to the data store 14.

The volatile memory 11 may be random-access memory. The data stores 12, 14 may be magnetic disks, for example.

The output device 1C may be the monitor of the computer 1, LEDs or an LCD distinct from the monitor, for example.

FIG. 2 is a schematic of the data-store switch 1Z according to an embodiment of the invention. In FIG. 2, the opto-isolators U2, U3 implement the switches 13, 19, respectively. The Basic Stamp II microcontroller U1 (from Parallax, Inc., Rocklin, Calif.) implements the controller 1A. The battery V3 implements the power supply 1B. The LCD display port J1 represents the output device 1C, and the switches S1, S2 implement the input device 1D. (Opto-isolator U4 detects whether the computer 1 has power.)

In a first mode of operation herein termed "normal mode," the computer 1 may run a predetermined operating system and application. Accordingly, the data store 12 may contain a correctly functioning copy of that software. The CPU 10 may access the data store 12, boot the operating system and then execute that application.

The data store 12 is termed herein the "boot data store." The data store 12 may contain a bootable, executable operating system and executable application.

The data-store switch 1Z may make the data store 12 accessible to the computer 1 as the boot drive (by means of the switch 13, for example). The data-store switch 1Z may also make the data store 14 inaccessible to the computer 1 (by means of the switch 19, for example). Otherwise, the data-store switch 1Z may idle, waiting for user input on the device 1D.

In the normal stage, the computer 1 may perform as a conventional computer. The user may run his application software, inattentive to the invention incorporated into the computer 1.

In a third mode of operation herein termed the "repair mode," the CPU 10 may run software on the data store 14 and the controller 1A may execute a program in parallel. A mode intermediate to the normal and repair modes, herein termed the "switching mode," may effect the transition from normal to repair mode.

In the switching mode, using an input device such as the device 1D the user may indicate that he wishes to repair software on the data store 12. (FIGS. 3A and 3B illustrate the switch-and-repair process according to one embodiment of the invention.) In response to the input, the computer 1 may switch from normal operation to repair, step 310, and repair the software on the data store 12, step 320.

The switching of a data store may be logical or physical. Logical switching is switching enforced purely by software. For example, software may set one or more predetermined bits that it or other software tests to determine whether a data store is accessible at any given time.

A physical switch opens or closes a predetermined electrical circuit of a device to be switched. A physical switch may, for example, alter the open/close state of identification jumpers of a data store. A physical switch may turn on or off the power supply to a device to be switched.

FIG. 4 illustrates the flow of control in a data-store switch 1Z according to one embodiment of the invention. On start up, the data-store switch 1Z may go into normal mode of operation. In this stage, the switch 1Z may set the switch 13 to make the data store 12 the boot drive, step 4A3. The switch also may set the switch 19 to leave the template data store 14 unpowered.

The data-store switch 1Z may then idle, waiting for the user to initiate the switch to repair mode, step 4A5. The data-store switch 1Z may display a message indicating that it is in normal mode, step 4A1.

When the data-store switch 1Z receives an indication to switch to repair mode, the switch 1Z may ask the user to confirm this indication, step 4B5. Confirmation is preferable where the repair process is destructive before it is constructive. Confirmation is preferable also because the activation of the input device indicating the switch to repair mode may have been accidental or ill considered.

On confirmation if requested, the data-store switch 1Z may switch power to the data store 14, step 4B9, making the data store 14 accessible to the computer 1. The data store 14 may be permanently configured to be addressable as the boot drive when it is accessible. Accordingly, the address of the data store 12 may then change.

In normal operation, the data store 12 may be addressable as the boot drive. However, during the switch, the switch 1Z may change the identity (address jumpers, for example) of the data store 12 to something other than the boot-drive identity.

The computer 1 is now ready to enter the repair stage.

Switched physically to repair mode, the computer 1 may boot from the template boot drive. The booted program or some other program executed during the boot sequence (autoexec.bat, for example, on machines running Windows™ operating system from Microsoft Corp., Redmond, Wash.) may query the user.

In one embodiment, on rebooting the computer 1 may automatically repair the data drive 12. It copies software from the template data store 14 to the data store 12 without further direction from the user. Previously set user preferences may, however, direct the course of repair.

Thus, where the template data store 14 contains only application software, the repair process may copy over or re-install that application software from the template data store 12. Where the template data store contains operating-system and application software, the repair process may copy over or re-install the operating system first and then the application software.

Uninstallation or deletion of an application may precede re-installation or copying over of that software. Re-formatting of the data store 12 may precede re-installation or copying over of the operating system. Resetting of ROM-resident parameters may precede re-installation or copying over of operating-system or application software.

On completion of the repair, the repair software may direct the user to switch back to normal mode and re-boot the computer 1.

Alternatively, the repair process may be menu-driven. The repair process may present the user a sequence of options to determine what repair process to execute. For example, on re-boot in repair mode, the repair software may offer the choices of running the repair process, reviewing repair-process settings, updating the template software (the application, operating system or repair-process software itself) and quitting the repair process.

The template data store 14 may contain application software, operating-system software and repair-process software. The application software may include the executable software itself (.exe, .dll, .o, etc.) or the files created by the application (.wpd files for Corel WordPerfect word-processing software, for example).

The software on a template data store 14 typically is an operating system and may include one or more applications, along with the underlying software to run the operating system (and any included application) on a computer with a predetermined configuration. The underlying software may include one or more boot records, one or more partition tables or a BIOS.

The template software is created by installing software onto a data store, by copying installed software onto the data store or by copying installation software onto a data store. (Installed software includes data files and other pre-existing software.)

The template data store software may be updated. Where the template software is installation-ready software, that installation software may be updated to a different, usually later, version. Where the template software is a backup of the software on the data store 12, a different, usually more recent, backup of the data-store software replaces or supplements that software.

Repair-process settings may include whether to recover data, run a virus check, reformat the data store, revert to a backup, run a human-mediated (i.e., manual) or an automatic repair, run diagnostics (software or hardware, for example). Repair-process settings may also include whether to format and at what level (quick versus low-level, for example), what software to re-install (operating system (OS) only; OS and executable-application software; OS, executable-application software and application data files; data files only, for example), whether to switch automatically (i.e., under program or hardware control), what level of repair to run (quick, better or best, in one embodiment), whence to setup (backup or template, in one embodiment) and whence to recover data files (most recent backup prior to repair, backup at the time of repair, other predetermined backup, query-and-response-specified backup, as examples).

The repair process may entail recovering a usable version of the appropriate data file. In some instances of computer repair, the problem is not so much with the operating-system or executable-application software so much as with the files (usually data files) associated with one or more of the applications. If the application in question is Microsoft Outlook, then the file to be recovered may be the mail-and-folder-data .pst file. Where the application is Microsoft's Internet Explorer, the file to recover may be the favorites file.

Running a virus check may entail first checking that the virus-check-and-repair software is up to date. Because new software attacks appear daily, and because newer malicious code has a higher chance of delivering a payload, this is not a trivial step. The software may then check for malicious code and repair software, as directed by the user or by default.

The above process presupposes that the data store 14 contains a copy of (a version of) the operating-system, application software or data file on the data store 12. In this sense, this second data store 14 is termed herein the "template data store." With the computer 1 switched to boot from the template data store 14, the computer 1 may perform the original copying of template software onto the data store 14. (Where the data store 14 is a read-only medium, it may arrive at the computer 1 in a pre-written state.)

An example of the operation of the computer 10 follows: Assume that the data store 12 contains a bootable Windows™ operating system (from Microsoft Corp., Redmond, Wash.). Assume also that the data store 12 also contains NaturallySpeaking® application software (Lernout & Hauspie, Ieper, Belgium and Burlington, Mass.).

The operating system and the application on the data store 12 may have each been run any number of times, and the user may have customized the operating system, the application or both to his preferences. In contrast, the template data store 14 may contain as-installed copies of the operating-system and the application software.

In the course of using his computer 1, the user puts the computer 1 into an undesirable state. He may, for example, foul up the optional settings of the operating system or application such that he cannot reset them to a usable state. He may download a virus, Trojan horse or other malicious code that changes his operating system, application or both. The particulars of the malicious code are unknown but the manifest effect is that the computer 1 is partially or completely inoperable. He may remove files critical to the correct operation of the software. As one of skill in the art will recognize, the ways in which software may be intentionally or unintentionally altered to the point of unusability are legion.

Recognizing that his computer 1 is in an undesirable state, the user activates the switch 13, step 300. FIG. 3 illustrates the switch-and-repair process according to one embodiment of the invention, and step 310 illustrates the actual switching. In response to the switch activation, step 300, the computer 1 repairs the software on the data store, step 320.

The repair process involves copying software from the template data store 14 to the data store 12. The software on the template data store 14 may be a master copy, a backup copy or an archive copy of software on the data store 12. (An archive is a copy of software, which copy cannot be overwritten or deleted.)

With template software on the template data store 14, the computer 1 may re-install or copy over software onto the data store 12. The computer 1 may overwrite all or part of any software on the data store 12.

The computer 1 may offer the user options as to how thorough its attempt to repair itself should be. In one embodiment, the computer 1 offers the options of a "Quick Repair," a "Better Repair," a "Best Repair" and a "Test." A Quick Repair may, for example, re-install or copy template software from the data store 14 onto the data store 12 without first re-formatting the data store 12. The Better Repair may perform a high-level re-format of the data store 12 before that copy or re-installation. A Best Repair may perform a low-level re-format of the data store 12 before copying over or re-installing software.

FIG. 4 illustrates the switch-and-repair process in more detail, according to one embodiment of the invention. The switching copies software from the template data store onto the data store, replacing the unusable software on the data store.

A number of situations occur where the computer 1 may effect repair without rebooting. For example, if only data files or application executables need to be repaired, then shutting down the operating system booted from the data store 12 is not usually necessary—especially in newer operating systems such as Windows 2000 (Microsoft) and more sophisticated operating systems such as Linux.

Further, a large number of operating-system files can be repaired (for example, by replacement) without shutting down the operating system. Repairing the operating system without rebooting is a preferred embodiment.

Still further, for backups (automated or otherwise), continuing to run from the data store already booted may be preferable. Where the computer 1 can become sufficiently quiescent that a backup from the data store 12 to the data store 14 can occur while still booted from the data store 12, then such a backup is quicker than shutting down and backing up the data store 12 while booted from the data store 14.

Where the data store 12 remains the boot drive when the data store 14 is simultaneously available, the data store 14 may be addressable as other than the boot drive. The address of the data store 14 may be switched similarly to the address switching of the data store 12.

A Virus and Hacker-Resistant Computer

FIG. 6A illustrates a computer 6 incorporating an embodiment of the invention. The computer 6 may include a CPU 60, volatile memory 61, peripheral controllers 67, 68, first and second non-volatile data stores 62, 64, data port 69, communications link 6A and buses 65, 66, all well known in the art. The computer 6 may also include a data-store switch 6Z.

The bus 65 may communicatively couple the volatile memory 61, the peripheral controllers 67, 68 and the data port 69 to each other and to the CPU 60. The peripheral controllers 67, 68 may communicatively couple with the data stores 62, 64, respectively. The data port 69 may mediate access to the communications link 6A.

The bus 66 may communicatively and electrically couple the peripheral controller 67 to the data store 62 and to the boot-store switch 6Z. More specifically, the boot-store switch 6Z may switch the power line 661 of the bus 66, thus powering up or down the boot store 62.

Likewise, the bus 67 may communicatively and electrically couple the peripheral controller 68 to the data store 64 and to the boot-store switch 6Z. The boot-store switch 6Z may switch the power line 671 of the bus 66, powering up or down the boot store 64.

The port 69 may link the computer 6 to other devices such as a modems, networks, etc. as indicated by the communications link 6A.

The computer 6 may operate in two states: Connected and Disconnected. In the Disconnected state, the computer 6 does not use the data port 69 to communicate and the data-store switch may enable the data store 62.

By contrast, in the Connected state, the computer 6 may use the data port 69 to obtain data over the communications link 6A. In the Connected state, the switch may enable the second data store 64.

Thus, the computer 6 may enable only one of the multiple data stores 62, 64 at any given time, which depending on whether it is accessing the communications link 6A. This isolates data received over the communications link 6A to one of the data stores, namely, the data store 64. Where the data received was maliciously created (a virus or a hacking executable), this data is confined to the data store 64.

The switching of the data stores 62, 64 may be done under manual, hardware or software control. A mechanical throw switched by the user when the user wishes to access (or cease accessing) the communications link exemplifies a manual switch. A boot-store switch 6Z that responds programmatically to the CPU 60 illustrates a software-controlled switch.

For example, if the user boots an Internet browser and the communications link 6A is the Internet, then the CPU 60 may programmatically recognize the (intended) launch of a browser and initiate the switch of the data stores 62, 64. The switch may involve re-booting the computer 6 in order to make the second data store 64 the only data store available during the use of the communications link 6A. (A browser on the data store 64 may launch automatically on the boot from the data store 64.)

In one embodiment, the computer may synchronously switch the port 69 and the second boot store 64. This may improve the resistance of the computer 6 to hacking or infection.

FIG. 6A illustrates the enabling of the data store 62 in conjunction with the defeat of access to the communications link 6A. The solid line continuing the power line 661 through the boot-store switch 6Z illustrates the accessibility of the data store 62. Conversely, the dashed lined through the switch 6Z illustrates the inaccessibility of the data store 64.

FIG. 6B illustrates the enabling of the data store 64 in order to support access to the communications link 6A. The solid power line through the boot-store switch 6Z illustrates the accessibility of the data store 64. Conversely, the dashed lined through the switch 6Z illustrates the inaccessibility of the data store 62.

The data store 64 may contain application software to process the data received over the link 6A. In such a setting the need to migrate the data on the data store 64 to the data store 62 may be minimal or non-existent.

Where, however, the application to process the data received over the link 6A and stored on the store 64 resides on the data store 62, then a process of migration is necessary. A predetermined time after receiving data over the link 6A, the computer may simultaneously enable the data stores 62, 64 and copy the data received to the data store 62 for processing there. The delay allows, for example, anti-virus software providers to produce and distribute security software addressing threats that have come to light since the time of receipt of the data.

The migration process may be manual or automatic.

A Lockable Network Computer

FIG. 7A illustrates a computer 7 incorporating an embodiment of the invention. The computer 7 may include a CPU 70, volatile memory 71, a peripheral controller 77, a non-volatile data store 72, a data port 79, a communications link 7A and buses 75, 77, all well known in the art. The computer 7 may also include a switch 7Z.

The bus 75 may communicatively couple the volatile memory 71, the peripheral controller 77 and the data port 79 to each other and to the CPU 70. The peripheral controller 77 may communicatively couple with the data store 72. The data port 79 may mediate access to the communications link 7A.

The bus 77 may communicatively or electrically couple the data port 79 to the communications device 7B.

The port 79 may link the computer 7 to other communicators through a communication device 7B and over a communications link 7A. Examples of the communications device 7B and link 7A include an acoustic modem 7B and a POTS telephone line 7A; a tap 7B and an ethernet 7A; and a wireless modem 7B and radiation-permeable space 7A.

The switch 7Z may switch a power line 771 of the bus 77, thus powering up or down the communications device 7B. The switch 7Z may switch (tri-state, for example) a data line 771 of the bus 77, thus interrupting or enabling the ability of the communications device 7B to transfer data to the data port 79.

The computer 7 may operate in two states: Network Connected and Network Disconnected. FIG. 7A illustrates the computer 7 in its Network Disconnected state, while FIG. 7B illustrates the computer 7 in its Network Connected state. (The solid line continuing the power line 761 through the switch 7Z illustrates the continuity of the power or data line 771, and dashed lined through the switch 7Z illustrates the discontinuity of that line 771.

In the Network Disconnected state, the switch 7Z may disconnect the communications device 7B from communicating on the data port 79. Accordingly, none of the software running on the computer 7 may access the communications link 7A.

By contrast, in the Network Connected state, the switch 7Z may enable the communications device 7B to communicate on the data port 79. Accordingly, software on the computer 7 may access the communications link 7A.

An exemplary use for the computer 7 is where a parent uses the computer 7 to access, say, his employer's computer network via a virtual private network (VPN) over the Internet 7A. The parent also wants his child to be able to use the computer 7 for school or recreation—but without access to the Internet 7A. The parent thus switches the computer 7 into the Network Enabled state when he (the parent) wants to use it, and switches the computer 7 into the Network Disconnected state when the child is to use the computer 7.

The switching of the data stores 72, 74 may be done under manual, hardware or software control. A mechanical switch thrown by the user when the user wishes to access (or cease accessing) the communications link 7A exemplifies a manual switch. A mechanical switch that may be locked with a key, for example, is preferable.

A switch 7Z that responds programmatically to the CPU 70 illustrates a software-controlled switch 7Z. (The CPU 70 may respond to any kind of input, including keystrokes, voice commands, biometric data and data received over a network.) A hardware switch 7Z may be considered as an analog computer.

A computer 7 running an operating system that supports hot swapping offers an advantage. The addition and removal of the communications device 7B from the computer 7 may confuse OSs that do not permit hot swapping of peripherals.

A Multi-Data Store Server

FIG. 8 illustrates a computer 8 incorporating an embodiment of the invention. The computer 8 may include a CPU 80, volatile memory 81, a peripheral controller 87, multiple non-volatile data stores 82a, 82b, . . . 82α, a data port 89, a communications link 8A and a bus 85, all well known in the art. The computer 8 may also include a data-store switch 8Z and a bus 86 consisting of the buses 861 or 862.

The bus 85 may communicatively couple the volatile memory 81, the peripheral controller 87 and the data port 89 to each other and to the CPU 80. The data port 89 may mediate access to the communications link 8A.

The peripheral controller 87 may communicatively couple with the data-store switch 8Z. The data-store switch 8Z in turn may communicatively or electrically couple to the data stores 82. The bus 861 may communicatively couple the data path of the switch 8Z to those of the data stores 82, and the bus 862 may electrically couple a power supply in or through the switch 8Z to the data stores 82.

The data port 89 may mediate access to the communications link 6A. The port 89 links the computer 8 to other communicators over the communications link 7A.

The computer 8 may operate in any of N states, where N is the number of data stores 82. In a first state, the data-store switch 8Z enables the first data store 82*a* to communicate with the peripheral controller 87. In the second state, the switch 8Z enables the second data store 82*b* to communicate with the peripheral controller 87, and in the Nth state, the switch 8Z enables the Nth data store 82α to communicate with the peripheral controller 87.

The corruption or other failure of the data store 82 currently communicating with the controller 87 prompts the switching from one state to another, and thus from the failed data store to another, working data store 82. (The failed data store 82 may then be repaired in place, or it may be removed and repaired, removed and replaced, or removed permanently.)

Where, for example, the computer 9 is a web server and the communications link 8A is the Internet, the multiple data stores 82 may provide resistance against infection and hacking by malicious users of the Internet 8A. If the hackers succeed in corrupting the data store currently attached to the peripheral controller, then a switching may occur from that corrupted data store 82 to another correct data store 82. This switching may occur very quickly (preferably as quickly as possible) in order to minimize the loss of access to the data on the data stores 82.

The switching may be manual, hardware or programmatic. For example, a diagnosis program may execute periodically to determine the health of the currently accessible data store 82.

A Computer With Peripherals That can be Cycled

FIG. 9A illustrates a computer 9 incorporating an embodiment of the invention. The computer 9 may include a CPU 90, volatile memory 91, a controllers 97, 98, a non-volatile data store 92, a port 99, a peripheral 9B and buses 95, 97, all well known in the art. The computer 9 may also include a switch 9Z.

The bus 95 may communicatively couple the volatile memory 91, the controllers 97, 98 to each other and to the CPU 90. The controller 97 may communicate with the data store 92. The controller 98 may communicate with the peripheral 9B.

The bus 97 may communicatively or electrically couple the port 99 (and thus the controller 98) to the peripheral 9B.

The peripheral 9B may be any computer peripheral. Examples include printers, USB devices, scanners, fax machines, data stores and keyboards.

The switch 9Z may switch a power line 971 of the bus 97, thus powering up or down the peripheral 9B. The switch 9Z may switch one or more data lines 972 of the bus 97, thus disabling or enabling the peripheral 9B to transfer data to the port 99.

A user of the computer 9 may be using the peripheral 9B, transmitting or receiving data on the from the device 9B as expected. The switch 9Z is supplying power to the peripheral 9B.

At some point, the computer 9 becomes unable to communicate with the peripheral 9B. This may be caused by an error in the software or hardware of the computer 9, including software or logic of the peripheral 9B.

The user attempts to revive communications with the peripheral 9B. The user may, for example, cycle the power to the peripheral 9B. Thus, the user changes the state of the switch 9Z such that the switch 9Z goes from powering to the peripheral 9B, to not powering that peripheral 9B, to again powering that peripheral 9B. This switching may be done manually, in hardware, or programmatically.

The cycling of the peripheral 9B may resolve the communication problem that the user was experiencing. For example, where the problem was with the software or logic of the peripheral 9B, then the power cycling may clear the software or logic state of the peripheral 9B. Where the problem was with the software or logic of the computer 1, cycling the power may clear the software or logic state f the controller 97 or applications running in the memory 91.

FIG. 9B illustrates an alternate embodiment of the computer 9. The switch 9Z switches both power and data lines.

A Multi-User Computer

FIG. 5 illustrates a computer 5 incorporating an embodiment of the invention. The computer 5 may include a CPU 50, volatile memory 51, a peripheral controller 57, multiple non-volatile data stores 52*a*, 52*b*, . . . 52α and a bus 55, all well known in the art. The computer 5 may also include a data-store switch 5Z and a bus 56 consisting of the buses 561 or 562.

The bus 55 may communicatively couple the volatile memory 51, the peripheral controller 57 and the data port 59 to each other and to the CPU 50.

The peripheral controller 57 may communicative with the data-store switch 5Z. The data-store switch 5Z in turn may communicatively or electrically couple with the data stores 52. The bus 561 may communicatively couple the data path of the switch 5Z to those of the data stores 52, and the bus 562 may electrically couple a power supply in or through the switch 5Z to the data stores 52.

The computer 5 may operate in any of N states, where N is the number of data stores 52. In a first state, the data-store switch 5Z enables the first data store 52*a* to communicate with the peripheral controller 57. In the second state, the switch 5Z enables the second data store 52*b* to communicate with the peripheral controller 57, and in the Nth state, the switch 5Z enables the Nth data store 52α to communicate with the peripheral controller 57. Only one data store 52 may access the peripheral controller 57 at any given time.

In one embodiment, the computer 5 has only one controller with multiple devices. In another embodiment, the computer 5' has multiple controllers, each with respective multiple peripherals. The switching then switches among the multiple peripherals of the first controller, the multiple peripherals of the second controller, etc. (The multiple controllers need not have the same number of multiple peripherals.)

Each data store 52 may contain self-contained software for a respective user or group of users. Each data store 52 may contain a bootable operating system, and optionally such application or data files as the user(s) corresponding to the data store 52 may require or desire.

Each user or group of users may use only a predetermined one (or more) of the data stores 52. Thus, before using the computer 5, a user sets the switch 5Z to the predetermined position enabling the data store 52 corresponding to that user to communicate via the controller 57.

In this way, a first user's data is separated from a second user's data on the same computer. The computer 5 more effectively separates users' data by enforcing security at a physical level rather than at the logical (software-enforced) level typical of multi-user operating systems.

In this scenario, re-booting between switches is desirable. Re-booting clears out the memory 51 in the switch from one user to another. Also desirable is a multi-key, multi-position lock. Any one key may turn the lock to any one predetermined position, enabling one corresponding data store 52.

The invention now being fully described, one of ordinary skill in the art will readily recognize many changes and modifications that can be made thereto without departing from the spirit of the appended claims. For example, in addition to switching software, data stores or other peripherals as described above, a computer may also switch properly functioning hardware for malfunctioning hardware. Indeed, in a computer with multiple mother boards, a switch may switch the functioning components of a computer from one board to another.

Also, while the description above usually uses data stores as the devices to switch, one of skill in the art will readily now realize that other computer components may be switched, including logic boards, ROM and controllers.

Under certain circumstances, danger or damage may follow from switching when power is supplied. Accordingly, a switch may be deactivated when such danger or damage may result. Logic such as the controller 1A may prevent dangerous or damaging switching by tracking power states, device identities, etc. and permitting switching, for example, when no electrical current is flowing to the devices to be switched.

Preferably, the switch is located in an easy-to-reach location. This contrasts with the typical location of USB, keyboard and other ports, for example.

On-the-fly Repair of a Computer

The following invention provides an apparatus and method of supporting the backup and recovery of a computing device. The computing device will typically include both a user computing environment and a supporting environment which enhances the stability and functionality of the user computer environment.

Processes

In one embodiment, a plurality of computing processes may be utilized to enable the On-the-Fly invention. Here, individual computing processes may monitor, track, predict the stability, backup, restore, or recover attributes within the user computing environment. The attributes may be software specific, data specific, operating system specific, or any combination. Utilization of the plurality of computing processes can facilitate the normal operation of the user computing environment. In one embodiment the user computing environment may be stabilized without user intervention such as requiring the user to shut-down, restart, logging off, logging on, or terminating applications. In one embodiment the supporting environment may have a capability interacting with the user computing environment. In one embodiment the supporting environment may be capable of initiating or causing the user computing environment to shut-down, restart, logging off, logging on, or terminating applications.

Different Computing Systems

In one embodiment the user computing environment and the supporting environment function in different computing systems. The two computing systems may reside in a common box. The user computing system may consist of data storage devices, RAM, processor, video card, and other attributes known in the art to facilitate a computing system. The supporting computing system may consist of a master template data storage device, RAM, processor, and other attributes known in the art to facilitate a computing system. In one embodiment, the data storage devices may be linked as needed to perform repairs. Such as, the need to copy data from the support environment to the user environment.

Snap-Shot of Data

In one embodiment, the present invention takes a snap-shot of the user computing environment. This snap-shot may subsequently be utilized to restore, analyze, or enhance the stability of the user environment. The snap-shot may include a stable image of the operating system, software applications, or user data. The snap-shot may contain an idealized or stable version of a disk drive utilized by the user environment, or a subset of the disk drive such as an individual partition. The snap-shot may also include an idealized version or image of the user system RAM, user system disk drive, user system partition image, memory of the video card, or any other memory stored or utilized in the user computing environment. These snapshots may be stored in the associated support environment data storage device Monitoring The supporting environment may monitor the user environment. The monitoring may include monitoring of processes running or enabled within the user environment. The monitoring may include monitoring both the utilization of the data storage device, data contained on the data storage device, and other aspect necessary for the normal operation of the user environment. This monitoring may facilitate identifying undesired changes, potential problems and also potential solutions. The supporting system may detect a freeze or other undesirable change within the user environment.

Recovery

When an undesirable change is detected in the user environment, the supporting environment may attempt to recover or restore or repair the user environment. The supporting system may be capable of re-enabling the user environment in a number of ways, such as resetting the keyboard in the event the keyboard locks the communication of keystrokes to the user environment. Further recovery of the user environment may be supported by reset connections such as describe by "Freezebuster", reset and clear devices as needed, replace defective software components as needed, and/or switch hardware components and/or devices as needed. The supporting environment and or supporting system may copy all or part of the data from one or more of the idealized snapshots mentioned above. These snapshots may be copied into their respective devices and/or locations.

Application Configuration

Another embodiment supports an ability to run two or more different programs at the same time on one computing system where the data and applications may be isolated from one another but may share output and/or input devices. In one embodiment, the applications may be isolated by executing the applications in a separate address space. The applications and data may be further isolated by utilizing two separated data storage devices. In order to safely send a command from one isolated data storage device to the other isolated data storage device the following may be utilized. In one embodiment, when an icon on the desktop icon is clicked the following may occur. The icon may execute a command that would launch a specific application on the other isolated data storage device. This may be accomplished by a shared ASIC that sends the command to the other isolated data storage device.

Another embodiment involves isolation of data with merged display. In this embodiment two user environments can be separated for the purposed of isolating data. For the AntiHacker System: A hard drive that does not contain "sensitive" data could be isolated and attached to a network. A second hard drive, may or may not be attached to the other hard drive (in any way), could be utilized for "sensitive" user data, but have no exposure to the network because it is "isolated" by a means of switching. The video signals associated with the data coming from these two hard drives could then be "merged" onto the same screen. In other words, all of the computing would be happening within isolated "secure zones" within a single computer but would not appear so to the user. Another example: the anti-virus system could use this method to isolate potentially infectious data.

Application Output

Applications may have its output displayed on the same screen alongside and/or superimposed upon the same screen with other applications and data that were being "computed" separately. Both computing processes may be separated but may then be "merged" together on the screen, and/or overlaid one another on the same screen. In one embodiment, this may be achieved by using multiple video cards. This concept can be applied for example to the Repair System, Multi User, Anti-Hacker, anti-theft and Anti-Virus.

In another embodiment both the user computing environment and the supporting environment will reside on a single computer system. A snap-shot of the operational user environment will be taken. The snap-shot will be associated with the supporting environment. Processes associated with the supporting environment will monitor the activities and status of the user computing environment. The monitoring function will become aware of any degraded performance of the user computing environment, such as a system freeze up. The monitoring function notifies the supporting environment of any degraded performance. The supporting environment will perform any recovery action as necessary to recover or restore the user environment. Recovery may include utilizing the snap-shot to recover or restore the user environment. An entire user disk may be restored. A specific application or software package may be restored, or particular files.

External Repair of a Computer

The invention may back up or recover a computing device. The computing device may include a user computing environment and a supporting environment which stabilizes the functionality of the user computing environment. The invention may include one or more external devices or removable media.

Master Template

A master template may be a copy of data that represents an ideal state of a computer system or component of a computer system. The master template may be created by copying data from an operational computer system or component of a computer system. The computer system may be in an ideal state before creating a master template. An ideal state of a computer system may be represented by data that is accessible to the computer system. Data, within this context, may include an operating system (e.g., Linux, Unix, Windows 98), applications (e.g., WordPerfect, Microsoft Office), user data (e.g., operating system preferences, background images, created documents), and component data (e.g., BIOS, PRAM, EPROM). Data may also include any information accessible to the computer system, including local and remote data storage devices.

As an example, the master template for one computer system may include all of the information installed on that computer system, such as Windows 98 operating system, WordPerfect application, documents created by the user. The information may be installed across multiple hard drives accessible to the computer system. Additionally, the master template may include a copy or an ideal-state version of the BIOS settings.

A master template may represent a snapshot of a newly purchased computer system. The system is typically in an ideal state with an operating system and various applications pre-installed, thereby allowing a user to begin utilizing the computer system. For a particular user, the master template may represent an ideal state of a computer system, including, for example, an operating system, applications, and user customizations. A user customization may include the users prior selection of a picture or ".jpg" image for a desktop background, such as a picture of the users pet.

Optionally, the master template may be created from a first computer system and subsequently may be used as a master template for a different computer system. An ideal state of the first computer is thereby transferred to a second computer system or any number of computer systems.

Backups

A backup is a copy of data that represents an information on a computer system or component of a computer system. The backup may be created by copying data from an operational computer system or component of a computer system. A backup of a computer system may include data that is accessible to the computer system. Data, within this context, may include an operating system (e.g., Linux, Unix, Windows 98), applications (e.g., WordPerfect, Microsoft Office), user data (e.g., operating system preferences, background images, created documents), and component data (e.g., BIOS, PRAM, EPROM). Data may also include any information accessible to the computer system, including local and remote data storage devices.

As an example, a backup for one computer system may include all of the information installed on that computer system, such as Windows 98 operating system, WordPerfect application, documents created by the user. The information may be installed across multiple hard drives accessible to the computer system. Additionally, the backup may include a copy or an ideal-state version of the BIOS settings.

An archive is a backup which typically may not be erased.

Data Storage Device

A data storage device includes memory devices, which are accessible to a computer system. A computer system is capable of accessing or storing data in a variety of memory devices. Memory device may include hard drives, RAM, ROM, EPROM, or BIOS. Memory devices store data (e.g., data or programs). User data is typically stored on disk drives, but may potentially be stored on any memory device. Typically, a computer system utilizes a variety of memory devices. For example, an operating system, applications and user data may be stored on a hard drive, a BIOS program may be stored in ROM, and BIOS data may be stored in a protected memory.

DSD

A "DSD" refers to a "data storage device."

Methods of External Attachment

Data Storage Device (DSD) may be an external device. A variety of protocols currently exist for utilizing external devices. Some of the more prevalent protocols include TCP/IP, USB, USB 2, Firewire, IEEE 1394, PS/2, parallel, serial, PCMCIA, SCSI. Other protocols and method of connecting external devices to a computer system will be apparent to one skilled in the art. As an example, a SCSI hard disk and SCSI CDROM are memory devices that may be attached to a computer system. The computer system may then read or write to the external device.

Repair Process:

An automated process may repair a data storage device of a computer system. The repair process may include multiple programs. The automated process may be triggered by a particular event or a set of events. The repair process may be specific to a particular data storage device such as the primary boot partition of a hard drive. The repair process may encompass a variety of functions which may be modified, added, of skipped based on the type of repair or user preferences. The user may modify user preferences.

In one embodiment, the repair process represents a sequence of functions. Typically a Master Template is either provided to the user or created by the user. Backups are created intermittently. The computer system becomes unstable and repair becomes necessary. The user may activate the repair process or the repair process may recognize the instability or problems with the system and activate the repair process.

Prior to repair, a Master Template typically exists for the computer system. The Master Template may have been created in a number of different ways. Several ways of creating one or more Master Templates for this computer system include: shipped with a new computer, created with the installation of software (e.g., software to support this process), created by a user-activated program, periodically created of a Master Template by a program.

Backups typically exist for a computer system. A backup may include user data and programs which have been stored on a data storage device accessible to the computer system. For example, documents may have been created or modified by a user. These documents may be stored as a backup. The user may have installed additional programs that may be stored in a backup.

During a backup process data is copied from a data storage device of the computer system to the backup data storage device(s). Any data that is accessible to the computer system may be backed up. The backup may be compressed. Compression may reduce the amount of storage space required to hold the backup. Incremental backups may also be used. Incremental backups may reduce the time required to perform a backup and reduce the storage space required to store them. Backups may be stored as archives.

Repair Process is Activated and (Optionally may be Confirmed):

The repair process may include a number of functions. The repair process may be initiated by a user, administrator, repair software, or repair hardware. The user may specifically initiate the process (e.g., double clicking on an icon of a graphical operating system). An administrator may initiate the process by communicating with the computer system over an internet connection such as TCP/IP. Repair software may initiate the process by utilizing a boot diskette or a separate boot partition on the hard drive. Repair hardware may initiate the process by sensing a frozen state of the operating system or hard disk, and subsequently initiating the repair process. Alternatively, the user may press a hardware switch which initiates a process to shutdown the machine, switch boot disks, and the subsequent startup may initiate the continuation of the repair process.

The repair process may be configured to allow the user to confirm the repair process in a number of scenarios. For example, before a DSD is reformatted the user may be requested to confirm the operation. The user may be allowed to halt the repair process.

The repair process may utilize a Master Template, Backup, Archive, various commands associated with an operating system, switching, and other programs, for repairing a computer system. For example, the repair process may format and partition a hard disk using an MS-DOS command, then copy a Master Template to the primary boot partition of the hard drive, then copy the latest Backup or Archive, then mark the primary boot partition as the active partition.

Any number of backups or archives may be used to restore the user DSD(s).

Command associated with an operating system may be used to reset or update DSD of the computer system. A DSD (e.g., PRAM, BIOS, or CMOS) may be updated through the use of commands associated with an operating system. Typically, MS-DOS commands may be used to download, save, reset, reset to the default, or update a BIOS version. For example, one step in the repair process may include booting into an MS-DOS partition, executing MS-DOS commands to update the BIOS of the computer system, then change the boot device and reboot the computer system to continue the repair process if necessary. Alternatively, the DSD (e.g., BIOS) may be set to a previously saved state. The previously saved state may be included as part of the Master Template, Backup, or an Archive.

The repair process may also be capable of managing DSDs. Managing DSDs may include testing, reformatting, analyzing, resetting, or determining bad blocks. Alternatively, the repair process may interact with other programs to provide management functionality of all or some DSDs. For example, the repair process may rely on operating system commands to format a DSD (e.g., a hard drive), but interact with a program to interact with another DSD (e.g., BIOS, PRAM).

The repair process may evaluate the present state of the computer system. As part of the analysis the repair process may determine or recommend a type of repair. For example, if the DSD (e.g., hard disk) is not responding then reformatting may be recommended. If only several files appear to be corrupted then the repair process may determine only those files need to be copied from a Master Template or a backup. Some or all of the data from a master template may be copied on to the DSD(s). Alternatively, the repair process may copy the entire master template to the DSD(s).

The repair process may perform a similar evaluation regarding how much of a backup needs to be copied. Some or all of the data from a backup may be copied on to the DSD(s). Alternatively, the repair process may copy the entire master template to the DSD(s).

Rebooting the computer system may be integrated into the repair process. Switching between boot devices may be integrated into the repair process. The repair process may switch the boot disk from hard disk 1 to hard disk 2. Power may be cycled such that hard disk 2 boots up as the active partition. A default program may be executed as part of the boot sequence to perform part of the repair process. Subsequently, the repair process may alter the hard disk 1, switch hard disk 1 to the active partition, and then reboot or cycle the power to initiate the booting of hard disk 1.

Some Exemplary Embodiments of External Device Embodiments

The repair process may be initiated or managed by an externally located device that may be communicative coupled to the computing device through, e.g., USB, Firewire, parallel, serial, PS/2, PCMCIA, or infrared. The external device may be the boot device.

An external boot device may be connected to the computer system with the boot device activating the repair process. The repair program may reside on the boot device or a second data storage device. The second data storage device may also be communicatively coupled to the computer system. The second data storage device may contain master templates, backups, or archives. The second data storage device may also contain the repair program or other programs which facilitate the repair process.

For example, an internal SCSI device "id 0" may be the default boot device. The repair process may switch the power to the SCSI device "id 0" OFF. The repair process may switch the power to an external SCSI device "id 0" ON. The repair process reboot the computer system by actuating a reset command (e.g., a mechanical device, a logic circuit). When the computer system reboots, the external SCSI device may be the boot device. The repair process may then continue as directed by part of the repair process on the external SCSI hard drive.

The repair process may include switching the device id's of a primary and secondary SCSI disk. In this second example, the internal SCSI drive may be "id 0" and the external SCSI drive may be "id 5". The repair process may change the internal SCSI device to "id 5" and the external SCSI device to "id 0". Switching of the SCSI device id's may be performed by the repair process (e.g., a mechanical device or a logic circuit, activated by the repair process).

In another embodiment, the BIOS may be modified to enable booting from an external device. The boot device may also be switched by updating the BIOS. Typically the BIOS defines the boot sequence. If the first boot device is not found, then an alternate boot device may be defined in the BIOS (e.g., the boot-device sequence is CDROM, A:, C:). The BIOS may be downloaded, modified, and restored. The BIOS may be updated (e.g., in place, via download-modification-upload) to change the boot identifier of a USB device, an IDE device, or other devices. The repair process may download a copy of the BIOS in a variety of ways. One example, includes booting into an MS-DOS mode, executing a program to save the current BIOS to a file. The BIOS file may be saved into a master template, backup or archive. Alternatively, the BIOS file may be modified by the repair process to change the boot sequence. If the BIOS file is updated then it must be loaded into the computer system to take effect. Effectively the boot sequence may be changed to another DSD, such as a second hard drive. The external SCSI disk with a specific "id" may become the "boot device". Another option involves storing multiple copies of the BIOS file, each having a different boot sequence, uploading the appropriate BIOS file may allow booting from a particular boot device (e.g., IDE hard drive partition 1, SCSI device "id 0", USB disk, Jaz drive, etc.). An external device may be the boot device and start or continue the repair process.

In another embodiment, a secondary boot device may be attached as an external Data Storage Device to a computer system (e.g., connect to a parallel port). This secondary boot device may activate or manage the repair process. The secondary boot device may contain programs to conduct processes such as reformatting another data storage device (e.g., internal or external hard drive), copying data from a Master Template, copying data from a backup or archive.

A program on the secondary boot device, or accessible to the secondary boot device, may be activated to create a master template, backup, or archive of and data accessible by the computer system (e.g., the user's main drive).

A program on the secondary boot device, or accessible to the secondary boot device, may be activated to repair a data storage device on the computer system (e.g., the user's main drive that needs to be repaired). In this scenario, the Master Template, Backup, or archive Data Storage Device(s) may be attached externally via USB, firewire, etc. The program may actively search for Master Templates, Backups, or archive DSD(s) and present the user with a list of options for restoring the computer system. Alternatively, the repair process may determine and select the best restore options and continue the repair process.

In another embodiment the repair process may be initiated by insertion of a floppy, cd, dvd, or use any other form of removable storage/memory or startup device, and rebooting the computer system. The removable storage/memory or startup device may boot if the BIOS boot sequence contains a sequence in which the boot order enables a removable media to act as the boot device. Booting from the removable media may trigger or activate an automated repair process (e.g., a program located on the removable media or an external device). Booting from the removable media may activate a mechanical device or program logic to initiate the repair process (e.g., switch hard disk device id's and initiate a reboot sequence to boot from another device to continue the repair process).

In another embodiment, a repair program or part of the repair process may be placed in a StorExecute, microcontroller, ASIC, etc. The repair program may activate a repair process. The repair program may include managing the repair process. Functions which may be performed include reformatting data storage device(s), switching between boot devices, switching electrical components within the computer system or external components, copying data to/from data storage device(s), (e.g., copying master templates, backups, etc, or any portion to another data storage device), and other repair functions. The repair process, may also be located, integrated, or embedded in an external device. A switch trigger that activates the repair process may also be located, integrated, or embedded in an external device.

In one embodiment, the startup device may be selected by a StoreExecute. Alternatively, a device identity may be assigned by a StoreExecute. The necessity to perform switching through the use of jumpers is thereby reduced. For example if a repair process is triggered, a StoreExecute may assign device identities to data storage devices or may decide which data storage device shall be used for the repair process, and which data storage device shall be used for boot data storage device if rebooting is utilized in the repair process.

In one embodiment during "on-the-fly" repairs, an external data storage device may be utilized for such things as the Master Template or backups, or for software used for the repair process.

In this embodiment, an external data storage device ("DSD") is attached to a typical personal computer that contains an internal data storage device. The internal DSD may be referred to as the "main user" data storage device. An external DSD may be attached via any available external connection.

Example of External Data Storage Device ("DSD") for Repairing a Computer:

In this example, a user attaches an external data storage device ("DSD") to a computer with any available external connection (e.g., Firewire, USB, SCSI, etc.). An external connection may include USB, USB 2, Firewire, IEEE 1394, PS/2, parallel, serial, PCMCIA, SCSI, and other protocols and method of communicating with an external device.

The user installs software on "main user" DSD that initiates a program to create a master template, and schedules Backups to execute every Friday morning. The master template is created by the program and stored on the external data storage device. Every Friday morning the repair process runs and stores a backup of additional information to the external data storage device.

A micro-controller and EPROM may be attached to the computer to perform part of the repair process. Attachment may be via any available external connection. The micro-controller and EPROM may be integrated into the external data storage device.

A switch trigger may be attached to the computer. Attachment may be via any available external connection. The switch trigger may be integrated into the external data storage device.

As another example, the main user data storage device is accidentally erased or damaged and that the computer system will not boot. The user decides to repair computer and initiates the repair process by activating a switch trigger, which initiates the following process:

The micro-controller may interrogate the BIOS of the computer system to determine its current boot up sequence. EPROM may store instructions for how to accomplish this.

The micro-controller may determine that it is necessary to alter the boot sequence so that the externally attached data storage device will become the boot device. The micro-controller and associated EPROM may flash the BIOS in order to accomplish this. The micro-controller may then send a command to computer to reboot the computer. When the computer reboots, it will reboot from the external data storage device.

Following the boot up, programs which are located on the external data storage device may execute the repair process as defined herein.

Backup of a Computer

The invention may backup, maintain backups, or recover data associated with a computing system. The computing system may include any number of components including hardware and software, and any memory accessible to the computing system. The computing system may focus on a user computing system and potentially the supporting environment which stabilizes the functionality of the user computing system (e.g., operating system, BIOS, etc.). Typically data associated with the computing system is identified by a variety of characteristics, the data is stored as a backup, and subsequently data within the backup may be restored or used to evaluate an existing computing system.

Backups

Data has a number of characteristics, typically including availability for use in a computing system. Data may include one of more of any of the following: operating systems, application, user data, data residing in the computing system (e.g., hard disk, hard disk partition, RAM, ROM, BIOS, CMOS, EPROM, electronic serial numbers, etc.), applications residing in the computing system (e.g., sample listed above), and backups created or accessible. The term data may be used to describe a specific aspect of information for association with a backup process. A backup process may include identifying data and the characteristics of data, for backup, management, or restoration. Data may also refer to a backup or set of backups. By default the data to backup may represent all data on a given disk drive, a given disk partition, or a memory.

Characteristics of the data may include an indication of what data is part of the backup, how to access the data, where to backup the data, frequency of the backup, and type of backup. These characteristics may be used to define or identify specific data associated with a backup process. Specific implementations may vary according to what characteristics are associated with the backup process.

What data to include is limited by the accessibility of the data to the computing system. Specific data for inclusion in a backup may be predetermined or determined as part of the backup process. Predetermined identification of data to include in a given backup may be provided by a hardware or software manufacturer, or a user (e.g., system administrator). Predetermined set of data may provide an initial indication of what data to backup. An operating system may, for example, include a list of files and or directories associated with operating system functionality. Here the operating system may provide a predetermined list of files or associated data representing the operating system or identifying specific data to backup (e.g., list of uses, user preferences, passwords, windows registry file).

A hardware system may, for example, include a memory address range (e.g., RAM, ROM, EPROM, BIOS, etc.) that represents data that may be useful to backup for that system. The hardware system may also identify other data within the computing system that may be useful in the backup process (e.g., applications to extract or update a BIOS). Typically, the data identified is useful in the backup process, such as understanding the operation of the computing system or restoring data in the event of a failure or corrupted data. Data identified for backup may also have a variety of uses including cleaning up the computing system which may have limited disk space (e.g., verify the necessity of data in a current computing system) and restoring identified data.

Alternatively, what data to include in a given backup may be determined subsequent to the delivery of a computing system to a user. Data may be determined with installation of hardware or software, or during the normal course of utilizing the computing system. A determination may be made with the installation of hardware or software. The installation process may be actively engaged in identifying what data would be useful to the backup process. The installation process may interact with the backup process or tools to identify program files and data specific to a given installation. The location of user file may also be helpful to the backup process. The contents of a user directory may be marked by the backup process for inclusion in a periodic backup. Accessing data by an application may also be integrated into the backup process. One example includes added functionality, such that saving data (e.g., a files) by the application includes an indication to the backup process to backup that specific data. The installed application may add the saved user file to a list of files that should be include in a subsequent backup. If multiple users access the same computing system, the file to be included in a backup may include an ownership indication.

Data to include may be identified according to directories or specific files. For example, data to include may be identified by file type, file location, directory tree, of memory device. A selective backup may backup only data associated with a specific system component such as a disk drive or data storage device.

How to access the data may be an important characteristic of the backup. An important consideration may be required for accessing, storing, formatting, modifying, restoring, and updating data of the various components associated with a computing system. Not all data is readily accessible according to a well known process of accessing a hard drive. As described above, data may include any data accessible to the computing system. Typically, a piece of data is uniquely accessible according to a predefined process. The process for accessing information from a disk drive is readily appreciated by novice users.

For example, accessing BIOS data for backup may involve booting into a particular operating system (e.g., DOS 5.x), running a hardware-specific program which may verify the hardware compatibility, executing a second hardware-specific program which may copy the data (e.g., BIOS data) to a floppy disk. Updating the BIOS in the example may involve running another program to flash the BIOS. Both the old and new versions of the BIOS, and associated applications can be stored as data in a backup. Consequently, a restoration of the old BIOS can be incorporated into the backup process. Similarly, other data accessible to the computing system may be incorporated in to the backup process by analyzing the existing processes for managing data for specific components within the computing system.

Where a backup is stored may be predetermined or determined as part of the backup process. A manufacturer of the hardware or software may provide an initial predetermined backup storage area or an indication of another device where the backup is to be stored. An operating system may access a second data storage device such as a disk drive, a second partition, or a pre-allocated file (e.g., similar to a swap file). Backup data may be stored to this initial location. A Hardware system may, for example, include a second memory or an address range of a memory (e.g., RAM, ROM, EPROM, BIOS, etc.) that represents the default backup location. Optionally, the backup location may be another storage device within the computing system or accessible to the computing system (e.g., across an Ethernet, firewire, USB, etc.).

Frequency of the backup can be based on any of a number of factors associated with the data and computing system including: volatility of data, volatility of the computing system, importance, upgrade schedule, user projects, personal comfort level, past experience with similar environments, degree of user participation, etc. Backups can be scheduled at particular times and intervals based on these factors. Backups may be initiated by the hardware, software, or a user. Similarly, other activities on the backup process, such as maintenance and restoration, may be performed based on a given frequency.

Type of Backup

A variety of backup types may be supported. The types may include at least one of the following: full backup, selective backup, partial backup, master template, data modified since a prior backup, or based in part on a comparison with a prior backup (e.g., a prior backup, or a listing of the contents of a prior backup). The type of backup may be defined for all data included in the backup, or part of the data associated with the backup process. For example, a backup may include an operating system wherein only files associated with the operating system and files modified since a prior backup are included in a specific backup. The specific backup may further include a user data directory identified for backup.

Data Represented in a Backup

Data represented in a backup may be identified by the various characteristics described above. Typically, data represented in a backup supports a backup process, such as a possible restoration of the data for use in a computing system. The backup or the various data contained in the backup may be a compressed or encrypted. Specific data in the backup may be an exact duplicate or enough information that the data may be recreated, corrected, or verified. For example, file differences may be included in a backup, thereby allowing a set of backups to be utilized to recreate or correct a file or data. How to access the data may also be represented in a backup for certain types of data (e.g.,BIOS) and not represented in a backup for other types of data (e.g.,"c:\my docs\*.docs").

Data to be included in a given backup may identify by hardware, software, user, or other characteristic of the computing system. A computer manufacturer may create an initial backup of a standard installation, which may include various forms of data associated with a computing system. The manufacturer sells the computing system to a user and may provide a master template as a backup that represents the manufacturers initial computing system configuration. This saves the manufacturer time and money, and gives the user peace of mind. Subsequently the user may install additional software and thereafter create a partial backup of the changes to the computing system. A comparison may be performed between the master template and data associated with the current computing system. Difference between the two can be identified as the data for backup. Here, data that has been changed, added, or deleted, in comparison to data associated with a master template may be identified for backup. Consequently, the master template and a subsequent backup may be used, according to this example, to restore the computing system to the level of functionality associated with the subsequent backups. A variety of scenarios will be apparent to one skilled in the art.

Repair Process

Restoring

Data represented in a backup is typically restored to a computing system. Restoration may include the selection of at least one of the following: specific backup, group of backups, specific data contained within a backup, and a master template. The restoration may initially determine the difference between the current computing system and a prior backup. Characteristic associated with the identified data may be used in the backup process (e.g., restoration process associated with BIOS which may have been included in a backup.).

The selection of a master template, for example, may return the computing system to an idealized state as defined by the master template. A master template and other data may be identified to restore the computing system to a state associated with the last backup in combination with the identified master template (e.g., master template represent the state as purchased, and the identified backup represents the state after a user installed several applications). Alternatively, a master template may represent an upgrade to the computing system. This upgrade may be combined with other user backup to enhance the functionality of the computing system and maintain existing user data.

Selecting Data

Data associated with the backup may be identified similarly to the selection of data for inclusion in the backup, as described above. This information may also be utilized to determine what data or aspects of the data to restore (e.g., specific users files).

Data matching a certain file type, file location, data storage device, device, component, description, date, wild card matching, etc. may be identified for restoration. The selection may be performed by the hardware, software, user, or any component in the computing system. In the event of an operating system failure it may be more appropriate to allow hardware or software select data to restore.

Restoration location for data may be specified by a user, hardware, software, default, original location of the data, temporary location, an alternate location (e.g., for further analysis), or by any component of the computing system. For example, a user may elect to restore data with wild cards such as "*.doc" and "*.txt" from all backups. The "*.doc" files will be placed in a user-specified or default file location (e.g.,"c:\documents folder\doc\"), and "*.txt" files will be placed in a user specified file location (e.g.,"c:\documents folder\txt\"). Alternatively, the data (e.g., files in this example) may be restored to their original location which may be identified in the backup.

Preferences

Preferences may be associated with the backup process, and may include preferences of hardware, software, users or other components of a computing system. Preference may be defined as a set of default values associated with the computing system, hardware, software, or particular users. Configuration information and characteristics may be defined as preferences for each component of the computing system. A preference associated with a BIOS may include a process or program for accessing the BIOS in a specific manner, such as booting to DOS 5.x, executing a specific program to extract the BIOS. Preference may be changed by hardware, software, or users.

The preferences can be used to define data characteristics (including backups), restore characteristics, and manage data. Preferences may limit the interaction required with users during the backup process (e.g., selecting data or restoring data). A new user may establish preferences to limit interaction with a backup process. A seasoned veteran may establish preferences to provide a more robust control of the backup process or aspects of the backup process.

For example, the specific characteristics of how the backup process interacts with updating a BIOS may be of a greater interest to an experienced user rather than a novice. In another example, user preferences may dictate the interaction between the user and the restore. By default, the restoration process my provide the user with a push button restore, such that the computing system will control the entire restoration process. Alternative, the user may modify the preference such that a user response is required before specific aspects of the backup process are performed (e.g., format hard drive, or flash the BIOS).

Software may also have preferences, which may identify data associated with the software, when installed, serial number, and possibly an indication of the best way to backup, manage, and restore the software. Preferably, preference associated with hardware and software would minimize interaction required a by user in the process.

Initiating Restoration

The hardware, software, or user may initiate and may manage the repair process. Data matching a restoration criteria may be restored. Criteria for restoration may be base on the data stored in the backup (e.g., frequency, master template, compression, encryption, etc.). Further criteria for restoration may be based in part on the type of backup or current status of the computing system (e.g., functional, hard disk failure, BIOS failure, OS non-responsive, etc.) The current status may be determined in part through the utilization of hardware and software to monitor the health of the computing system. For example, hardware or software can monitor the computing system for any indication of a keyboard "freeze", and activate part of the backup process to return the computing system to a normal operating state. Utilization of hardware and software can be used to maintain the health of the computing system. Maintaining the health of a computing system may include determining backup process characteristics which may be based on user preferences. The frequency of backup may be a way to help ensure the computing system's health.

For example, an alternate boot sequence may be initially established in the BIOS such that the computing system initially attempts to boot from a primary disk drive and subsequently to a second drive. The second drive may contain software designed to boot the machine and evaluate the present condition of the computing system. Once the necessity of any repairs have been determined, the software may proceed to correct the malfunctions and return the computing system to a normal operating state. The software may then reboot the computing system to the normal operating state, thereby minimizing user involvement in the repair process.

Removing Data

During a restoration, process data may be removed including: deleted, moved, renamed, or altered. The method of removal may be specified as part of the data characteristics. The restoration process may require the computing system to reflect the data contained in a backup, and therefore necessitate the removal of some data. For example, in restoring data representative of an operating system, a preference may provide that existing inconsistent files may represent the culprits behind a malfunction predicating the restore process. Removing this additional data (files in this example) may be warranted. Removing extraneous data may be performed in a number of ways based in part on the type of restoration, preferences, characteristics of the backup or data, and the goals of the backup process (e.g., minimal user involvement). For example, if the goal is to restore the master template, then as part of a comparative restoration all data determined to be different from the master template may be removed to a specified data storage device or memory such as a default folder.

Restore Specific Data

The hardware, software, or user of a computer system may request the restoration of data. To facilitate the restoration of specific data a user may perform a restore based in part on: file type, creation date, user identification, modification data, backup date, or any characteristics of the data. For example, a completed restore may include a default folder that contains all data from the last backup which differs from data currently available for access to the computing system or some subset of all of the data (e.g., specified according to preferences). Alternatively, the folder may contain all data which differs when comparing two backups, such as the last backup and a master template. Data conforming to the users request may be sorted into different directories to provide the user with an indication of the information contained therein, such as "This is probably your stuff Feb. 25, 2003", "Is any of this your stuff? Feb. 25, 2003", and "Probably not your stuff Feb. 25, 2003".

Managing Restored Data

Preferences may also control what happens to restored data. Data restored may be available to the user or the computing system for a limited duration, to reduce the amount of memory utilized by the computing system. For example a user definable preference may indicate that a dialog warning that the folders named "Is any of this your stuff? Feb. 25, 2003" and "Probably not your stuff Feb. 25, 2003" will be automatically deleted in 10 days and if the user desires data from those folders the data should be moved prior to the expiration date. Optionally, a preference may provide that after 10 days the contents specific folders may be moved to a temporary "trash" folder with a new expiration date of 30 days.

Placement of Restored Data

Placement of data may be defined in part by the data characteristics stored with the backup or data, the characteristics associated with the backup process, and the preferences. Data, such as user data, may be returned to an original location, and other data may be placed in a different location. For example, user data located on the desktop may be returned to where it was, whereas user data located in the system folder may be returned to its original location depending in part on preferences. Alternatively, user data may be deposited in a default or indicated location such as a "documents" folder, a "Your Stuff is In Here" folder, a "proposed trash" folder, a "trash" folder, or other custom locations.

Master Templates

A master template is a backup of data, representing a computing system according to an ideal state. The ideal state typically includes an operating system, a collection of applications or software. The data included in the master template may have been specifically chosen for a particular user and for a particular hardware configuration.

A master template may be created or updated according to a variety of approaches. One approaches involving a data storage device may include: 1. Creating several backups of data on a data storage device over time; 2. An activity associated with the backup process, such as a repair process is triggered; 3. A backup of user data files is performed (e.g., to save the users current work); 4. Existing data storage device (e.g., memory) may be reformatted or tested, and may be performed according to preferences for that data storage device; 5. The master template is copied to the user data storage device; 6. Backup of user data files is restored to the user data storage device. The computing system is thereby restored to a normal operating state with minimal user intervention.

The master template may also be updated, changed, or modified in a variety of ways including: by the user, by access to an update (e.g., an incremental release by a computer manufacture), or by access to a replacement master template, etc. The preferences associated with a master template may provide a method for performing these modification.

The master template may be tested to ensure the master template and the repair process functions as expected in the backup process, such as restoring the computing system This testing helps ensure the functionality of the master template, the restore process, and may also be used as a virus check and repair. An on-line service may be provided to detect virus, verify the integrity, or to update a master template.

Restoring

A backup may be tested to verify its integrity (e.g., with a checksum and verifying readability). If the backup is tested and fails, the user may change the preferences. The user may restart the repair process, select different preferences (e.g., applications or software), upgrade the backup (e.g., master template), and retest the backup. If the backup passes the verification tests, the user may accept the backup and continue with the restore. When a backup (e.g., master template) is accepted it can be copied from its storage location to a second backup (e.g., the new master template). The old master template(s) can be saved so that it is possible to revert back to prior master templates. After the user template is "accepted", the backup user data is returned to the user data storage device.

In one embodiment, a master template can be created by the user selecting to "boot into" a master template. The user may then make changes, install new software, make modifications, etc., and then exit. This approach allows the master template to be updated independently of user's documents and other data which may not be a beneficial to a master template.

In a different embodiment, the master template may be modified/updated by the user first conducting a repair of computing system. The repair process may automate 1. The backup of user files according to preferences, potentially including particular file types (e.g., documents); 2. the reformat of the user's primary disk drive or the restoring of the master template to the user's primary disk drive. The user may then install new software to an essential copy of the master template as present on the user's primary disk drive. A backup may subsequently be activated to generate a new master template version. A backup of the user's data (e.g., user specific documents) may then be restored to the computing system. Preferably, restoring the user specific documents is performed automatically.

The master template may be created by a process of selective copying. For example, depending on the particular OS in use, a program may interrogate the registry, determine what entries are associated with a particular program or application, and then choose to selectively copy only those files and entries associated with the particular program or application to the master template.

A Computer with Special-Purpose Subsystems

Switching mechanisms

A variety of events may trigger a repair system to perform a repair process on a primary system(s) to be repaired. An event, such as switch triggers, may include single step and multiple steps. Each step may include a logical or physical action initiated by the repair system itself, user, external system, or the primary system to be repaired. A step may include a logical or physical confirmation of the repair process. Individual steps may be automated by the repair system, switching process, or a primary system. An example of multiple steps that trigger the repair system may include 1) pressing a button, and then 2) sliding a switch for confirmation of the repair process. Other steps will be apparent to one skilled in the art and are therefore not described herein.

The repair may include any process that attempts to place a primary system into an idealized state or restored state. The repair system may include various apparatuses and methods previously described, including the switch process. As an example, the repair system may be triggered by voice recognition or voice identification associated with an individual step or multiple steps of a triggering event. In one embodiment, pressing a physical button triggers the repair process.

In another embodiment, the repair system may include a processor and logic that is independent from the primary system. Events may trigger the repair system independently of the primary system. The repair system may be triggered by a variety of events independently of the primary system to be repaired. Here, the repair system would be capable of receiving or recognizing the triggering event.

For example, the primary system may be nonoperational while the repair system remains operational with the capability of recognizing events that trigger a repair process, such as a user request to repair the primary system. The repair system may perform the repair process or may trigger another system or application to perform the part or all of the repair process. Other applications may include such programs as: Virus Scan, Virex, Arcserve, Assimilator, Deep Freeze, Ever Dream, Filewave, Ghost, Goback, HddSheriff, PCRdist, Retrospect, RevRdist, Rewind, Hard disk toolkit, Anubus, Drivesetup, and Charis Mac.

A repair system may include a physical switch used as a step of a triggering event for a repair process supported by other applications. Alternatively, the triggering event may activate a repair process that is performed by other applications. For example, steps associated with a button, voice command, personal identification card, retinal scan, or push button with a confirmation by a slide button, key switch, or diagnostic process, could be used to activate a repair process by other applications.

In another embodiment, when a primary system, such as a computer, is started an application associated with the repair system may be triggered to perform diagnostics on the computer. The application may be used to determine if the second computer attempts to start, such that, if the second computer does not attempt to start then the repair system may modify the boot sequence of second computer to boot to a different device. The application may also initiate the rebooting of the primary system. If the second computer does start, the repair system may analyze or record the boot sequence. If boot sequence fails, the repair system may automatically reboot the primary system using a different data storage device to boot and may also initiate the repair of the primary system. The repair system may also manage an "on the fly" repair process, as defined previously.

In one embodiment the push of a button (or other trigger event) triggers the repair system to perform a diagnostic process and based on diagnostic results the repair system may perform the appropriate repairs. Physically pressing the button may be the only step of the triggering event. As part of the repair process, the repair system may perform a diagnostic process. The repair process may include interacting with a user to determine the repair process. For example the user may be prompted to respond to several questions, such as, "Your computer will soon need a repair that could take 60 minutes to perform, alternatively a temporary repair may take 5 minutes to perform. Which repair should be performed?" The user response may be taken into consideration by the repair process.

A Computer With Multiple Special-Purpose Subsystems 1120

FIG. 11 is an illustration showing a computer with multiple special-purpose subsystems 1120-1, 1120-2. This section describes apparatuses and methods of protecting computers and computing devices from hacking, viruses, cyber-terrorism, and from potential damage or intrusion such as spy software, keystroke recorders and damage from hacking, viruses, worms, Trojan horses, and similar threats and vulnerabilities. Cyber-terrorism is an attempt to cripple or subvert a computing system. The present invention provides a solution to potential cyber-terrorism.

A computer system of the prior art typically includes: a processor, memory, display, a display controller, and input/output controller. The present invention provides a plurality of special-purpose subsystems 1120-1, 1120-2, . . . , 1120-N housed within a computer system 1110. These special-purpose subsystems typically perform limited functions and have limited interaction with other special-purpose subsystems.

Special-purpose subsystems may be designed for many purposes, including to support storing information, performing work, and handing communication. A storage special-purpose subsystem may be designed to store data and retrieve data, while allowing limited assess to the stored data. A working special-purpose subsystem may be designed to process information, such as a general purpose computer with various applications. A communication special-purpose subsystem may be designed to facilitate communication between other special-purpose subsystems.

Each special-purpose subsystem 1120 typically includes: processing capability, memory, logic, and an interface. Processing capability may be a computer processing unit (CPU) or ASIC. The processing capability may be the computer-system CPU, or a CPU shared by multiple special-purpose subsystems. Thus, the processing capability associated with a special-purpose subsystem may also be used by the computer system or other special-purpose subsystems.

Memory may include any data storage device accessible to the special-purpose subsystem. Further, a specific memory area may be divided into logically separate areas, each of which can be associated with different special-purpose subsystem. A controller associated with the specific memory area may be configured to restrict access of a given logical memory area to a specific special-purpose subsystem. Each specific memory area may thereby be effectively isolated for use by a special-purpose subsystem.

The logic of a special-purpose subsystem supports the intended function of the system, such as storage, work, or control. The logic may include the ability to move a file, display a file, provide a directory of information available from special-purpose subsystem and other functions as necessary. Further, the logic may include or be incorporated in an operating system associated with the special-purpose subsystem. The logic may be read only or inaccessible from other special-purpose subsystems to avoid potential attacks. For example, the logic may analyze and record when files are read or written, access attempts, and associated timing. This information may be used by the logic to determine if protective measures are necessary, such as prompting the user for a confirmation of an action or denying access to the special-purpose subsystem.

The interface of a special-purpose subsystem supports the intended function. An interface 1170 of a storage system 1120-1 may include logic to read and write files. An interface 1170 of a working system may include a copy of a master template and applications to process and modify information, including storing temporary files. A controller system may provide an interface for receiving requests from a working system, requesting a file from a storage system, receiving the file from the storage system, and sending the requested file to the working system.

A interface 1170 may also support interaction with common controllers 1130 of the computer system 1110, such as for a display 1140, keyboard 1150, or mouse 1160. Alternatively, the special-purpose subsystem 1120 may include a separate controller for accessing common peripheral devices. Each of the interfaces associated with a special-purpose subsystem may be enabled or disabled according to a logical or physical switch, such that interaction with the special-purpose subsystem is halted or restricted to a subset of functionality associated with the interface.

According to one embodiment illustrated in FIG. 12, two special-purpose subsystems are provided within a computer system, the first being a working system 1120-3 and the second being a storage system 1120-1. The computer system may include a display 1140, a display controller, and an I/O controller. Both of the special-purpose subsystems are capable of interacting with the computer system display controller 1140 and the computer system I/O controller. A separate area of the computer-system display may be associated with each of special-purpose subsystems. If a display area is selected or otherwise active, then keyboard, mouse or other I/O-controller-mediated input would be accessible to the associated special-purpose subsystem.

Another embodiment, includes a working system and a storage system that does not allow execution of data stored (with the exception of the storage-system logic). The storage system prohibits the execution of user data, such as any information stored by a user in the memory of the storage system. The two systems are isolated from one another, and therefore events taking place in the working system cannot directly affect information stored in the storage system. Communication of data between the two systems may be through a communication controller that performs a copying process associated with moving data, such as a file, between the storage system and the working system.

Communications between special-purpose subsystems, such as the working system and the storage system may be through a communication controller, according to one embodiment. The storage system may communicate specific information to the communication controller to transfer the specific information to the working system. The communication controller may also transfer specific information from the working system to the storage system.

A user selection of a file in the storage system can be used to prompt a communication controller to copy the file from the storage system to the working system. The file can be executed or processed in the working system. Then, the file may be saved causing the communication controller to copy the file from the working system to the storage system. In the storage system the file is not executable and thus could not corrupt other files or data associated with the storage system even though the file itself may be infected with a virus or corrupted. The working system does not typically allow user data, e.g., document files, to be stored in the working system unless they are currently being used, e.g., temporary files.

Alternatively, the communication controller may interact with the common controller to display information available from the storage system. User selection of the specific information may be performed through interaction with the communication controller. For example, the communication controller may request a list of available files from a storage system, and arrange them for a display of the list through a common display driver. A user could select a file from the list for processing in a given working system. Consequently the communication controller may cause the file accessible to the storage system to be copied to the given working system. After the working system is finished processing the file, the file could be saved through the working system's interaction with the communication controller. As such the storage system and the working system are not required to directly interact with one another.

Additionally, the communication controller may perform an analysis on data accessible or transferred by the communication controller to determine the level of threat associated with storing or transferring the data, may refuse to handle the data based in part on the level of threat, may present the user with information which indicates a threat and a request to confirm the transfer or storage. Information presented to users may include the number of requests in a given time frame, extent of modifications, or origination location. The user response may be received by the communication controller and used to determine whether to allow the transfer or storage.

The working system may include a copy of a master template that represents an idealized state of an operating system. The working system may be an existing computer system capable of running an operating system, and additional logic for interaction with a special-purpose storage system. Typically the working system is incapable of interacting directly with the storage system. According to one embodiment, an interaction may be initiated by the storage system, or the controller system.

The working system is a special-purpose subsystem, and may be used to perform processing, editing or modifying data. The working system typically includes logic to display information to a user through the display controller to the computer display. Users can interact with the working system as though it were the primary computer system. The display controller and I/O controller may be used by the working system to interact with other devices associated with the computer system.

The storage system is a special-purpose subsystem, and typically includes data files that are stored in a data storage device. The data storage device may be volatile or non-volatile. The storage system may represent an existing computer system capable of running an operation system, and additional logic for interacting with a working system.

According to one embodiment, the storage system initiates an interaction with the special-purpose working system. Alternatively, the storage system interacts with other special-purpose subsystems through a communication controller. The storage system may include logic to display information to a user through the display controller coupled to the computer display.

Each special-purpose subsystem may present information to a user by utilizing the same computer display. Thus, information presented on the computer display may overlay other information being displayed by another special-purpose subsystem. The user may select specific information, e.g., a document file, to work on. The user selection of the specific information may be communicated to the storage system through a common device associated with the computer system, such as a serial I/O controller connected to a mouse or keyboard. The serial I/O controller may be utilized when storage information is presented to the user. After specific information is requested, the storage system may transfer the specific information to another special-purpose subsystem such as a working system. The storage system may initiate the transfer of the specific information. In one embodiment the storage system initiates the transfer to a working systems interface. Alternatively, the storage system initiates the transfer to a common memory area for access by a working system. Another embodiment provides the storage system transfers the specific information according to a communication controller to the working system.

The working system may then access the specific information provided by the storage system. After processing, modifying or viewing the specific information, an altered version may be saved or returned to the storage system. Before saving the specific information, the working system may perform an analysis to determine the level of threat associated with storing the information, and may refuse to save the information or may present the user with a confirmation request and information which indicates a threat. The working system may save the specific information to the storage system, the working system may transfer the specific information to another special-purpose subsystem such as a storage system. The working system may initiate the transfer of the specific information. In one embodiment the working system initiates the transfer to a storage systems interface. Alternatively, the working system initiates the transfer to a common memory area for access by a storage system.

In another embodiment, the working system transfers the specific information through a communication controller to the storage system.

In one embodiment, the storage system may perform an analysis to determine the level of threat presented by storing the information, and may refuse to store the information or present the user with a confirmation request and additional information which indicates a threat.

Data may be moved between special-purpose subsystems using a separate logic control device, such as an ASIC or logic control device utilizing direct memory access. The process of moving data does not allow the data to be executed, which could possibly enable hacking, viruses, and the like. Additionally, data may be encrypted, compressed, or encoded to prevent its execution.

A control system may be an additional type of special-purpose subsystem, and could provide overall operation of the computer, computing devices, and other special-purpose subsystems. Additionally the control system may orchestrate the process of copying data, switching network communication, and repair functions as needed. The control system may be read-only, permit read only access as needed when interacting with other special-purpose subsystems such as a storage system or working system. Both the network communication and repair process may be controlled by the control system. Optionally the control system could have limited communication with other special-purpose subsystems while maintaining an ability to initiate or conduct a copy process, activate and terminate communication to other special-purpose subsystems.

Special-purpose subsystems may be combined into a single special-purpose system that performs functions associated with the individual special-purpose subsystems, such that the single special-purpose subsystem functions performs the functions as separate threads. In one embodiment, a storage system, communication system, and working system may be combined into a computer system as individual processes executed by the computer system. The computer system may utilize any method of isolating the individual processes using techniques known in the art.

In contrast, a special-purpose subsystem or a set of special-purpose subsystems may be spread out over a number of additional special-purpose subsystems, such that some of the functionality associated with the system or set is performed by the additional special-purpose subsystems.

Repair Process

Optionally, a special-purpose subsystem may be repaired or returned to an ideal state using an automated repair process. Such repairs may be conducted "on the fly", or after each transaction or without rebooting. Master templates typically represent an ideal state of a special-purpose subsystem, and may be stored on a storage system. A transaction may include reading e-mail, wherein the opening of each individual e-mail messages represents a separate transaction. Optionally, one or more items can be ignored during a repair process. For example if an e-mail has been opened, a repair process may run ignoring the open e-mail, detect and repairs problems, and then a user may respond to the e-mail without quitting it. In another embodiment, all downloads and e-mail can be saved immediately to the storage system prior to opening the download or e-mail in the work subsystem.

In one embodiment, the logic of a special-purpose subsystem, such as a working system, may trigger an event associated with a repair process. The repair process may perform a comparison between a master template of the working system and state of the current working system. Any differences between them could trigger a subsequent repair process in which some or all data that is different is deleted from the working system. Further, data may be copied from the master template by the repair process as necessary. In one embodiment, the repair process may make the working system identical to the master template.

In one embodiment, a repair process can be conducted after one or more e-commerce transactions, or after surfing one or more web pages, and the like. Thus all known and unknown viruses and Trojan horses can be made impotent prior to the next transaction. While this process does not eliminate viruses, worms and Trojan horses from the computer (they may be stored in the storage system), it keeps them in an in operative state. The repair process could repair volatile and non-volatile memory, or clear volatile memory, or set volatile memory to an ideal state.

In one embodiment, if the user selects more than one e-mail to open, two or more e-mails could be copied to the working system and could be open simultaneously. Optionally each e-mail could be copied to its own separate isolated working system, opened, viewed, and worked on separately. If the user needs to copy data from one isolated e-mail to another isolated e-mail, a copying process can be used that does not allow code to execute.

In one embodiment, web commerce software, or e-mail software, or any software can be modified so that individual records, or only copies of the records that are specifically needed for a transaction are copied to the storage system, utilized and then copied back to the database in the storage system, and after each such transaction a repair can be conducted. Optionally, in a transaction in which data interacts with more than one database or CGI for example, the transaction can be broken up into discrete segments, data copied to and from the isolated storage system(s) or working systems as needed, and repairs can be run between each segment of a transaction, or between some segments of a transaction. Optionally, software can contain instructions that define what type of data can comprise a transaction, limiting the copy process to only copying data that meets certain criteria.

Cyber-Terrorism Examples

Cyber-terrorism represents a number of threats. One such threat occurs when e-mails are downloaded of which one e-mail contains a virus that when executed has the ability to infect other e-mail, infect the e-mail program so that it sends a copy of the virus with each new e-mail sent, and the virus places a hidden item in the operating system or applications that when executed after a period of two days, destroys the format or data structure or device drivers contained on any accessible data storage device, Such a virus may have been unknown and no protection or method of identification is available from virus-detection companies.

The protection process is described for processing e-mail, according to one embodiment. Upon download to the working system the unopened e-mails are then copied to the storage system (or alternatively they could be directly downloaded to the storage system) using a method in which the data cannot execute. A list of the e-mail subjects and who sent the e-mail and other pertinent information can be created and displayed to the user. For example this list could be generated by the storage system or the control system. User selects an e-mail to open. A copy of that e-mail is copied to the working system and then may be automatically opened. Optionally, a virus scan of the e-mail may be conducted. User reads and responds to the e-mail, and the response may be copied to the storage system. A repair process may take place and repairs volatile or non-volatile data storage devices as needed.

Further, according to the example, a user selects next e-mail to open. This e-mail contains the virus. It is copied to the working system and is opened. No other e-mail is available for it to infect, but the e-mail infects the system folder used by that working system and several applications used in that working system. The user decides to respond to the e-mail and selects "respond". Optionally prior to responding, a repair process can be run or comparative process may be made between a master template and the working system. During the repair process or comparative process, the changes to the operating system associated with that working system or applications could be noted, and based on the difference(s) a virus warning could be drawn to the users attention, warning user not to respond to the e-mail as it may negatively affect the computer receiving the e-mail. Optionally a dialog can suggest that the user contact a virus alert center (e.g. such as a national or international virus alert center that collects or responds to potential virus alerts.) and notify the center of the virus, or to allow the repair process to notify a virus alert center concerning the potential virus.

Optionally, based on certain criteria such as a virus threat analysis based on the type of changes made to the operating system or applications, the repair process could initiate commands to disable the network connection or e-mail software, or disable the e-mail process, or give the user a dialog indicating that based on the results of the virus threat analysis, the user may not be permitted to respond to the e-mail, and the ability to respond to that e-mail has been disabled. That e-mail could then be destroyed, or quarantined, or kept in isolation or kept in a storage system. Optionally such virus could be stored and deletion would not be permitted, pending approval from some entity, such as a virus alert center that could authorize destruction of the virus by providing (for example) a code that would allow destruction of the virus. Optionally upon receiving such code the repair process could automatically destroy the virus laden e-mail. Optionally, the file could be encrypted or compressed, or modified in such a way that it could not execute and the repair process could send it to the virus alert center (with or without permission from the user.)

Optionally, such modification to computers and computing devices may be required by law, and the part of the repair process that dealt with potential viruses may be modified as needed to interact with government/commercial virus checking companies. For example a method of allowing upgrade of the software that dealt with viruses, permission to delete files, etc. may be required. In such cases specialized code could be created to interact with government agencies that would allow or require upgrade of the repair or virus checking software, allow or deny destruction of infected files, etc.

The repair process may run and make the working system identical to the master template, destroying all viruses, worms, and other changes in the process. The user finishes with the e-mail and selects the next e-mail. A repair may be conducted and then the next e-mail may then be copied to the working system, without risk of infection.

Loading a Master Template Into Volatile Memory

In one embodiment, to further speed the repair process a master template of the working system and the software in the working system, may each be loaded into their own separate isolated volatile memory areas or shells to increase the speed of the repair process. Thus, if data in the working system is in volatile memory and the master template is in volatile memory, repairs can be conducted at higher speeds. Alternatively a new working system shell can be utilized, eliminating the need for a repair. For example a user could open an e-mail, and read the e-mail using one shell, and if they want to respond to the e-mail a second shell could be used for the response. (Optionally the first shell can be checked for a virus while the user is writing a response to an e-mail using a second shell.) Additional shells can be made ready for use.

In another embodiment, data can be downloaded directly to a storage system, using a method of encrypting or compressing or other copying which prevents execution of the data. A virus checking or repair process can be run as part of the repair sequence, or as a separate sequence. Optionally, an isolated hidden backup or archive system may be utilized with this invention, which may make an array of hidden backups or archives of the storage system or working system volatile or non-volatile memory/memories or data as desired, and which may be time stamped. Copying of data to such backup or archive system could also use techniques described herein to prevent execution of files and damage to the data on the backup system.

Optional Information Regarding Copying or Saving Data

In one embodiment, the process of copying data may be dumb or restricted so that data being copied can't execute and thus the data on that data storage device can't be damaged by malicious code. For example, to move/copy data it can be encoded, or an ASIC can be utilized, or direct memory transfer or any other method of moving or copying data can be used that does not allow data to execute.

Optionally, copying could be orchestrated by a StoreExecute/control system that could have access to the isolated working system(s) and isolated storage system(s).

Selecting a file to open in the storage system could initiate a process whereby a file is copied from the storage system to the working system and opened. Saving a file in the working system could initiate a process whereby the file is copied to the storage system. Quitting a file in the working system could initiate a process whereby the file is copied to the storage system and deleted in the storage system.

The term "copy" or "copies" or "copying" may be used in its broadest sense, and may include an algorithm, snapshot, compressed data, bit by bit, encryption, encoding, and the like.

Optional Information Explanation of Data Storage Associated with the Working System Optionally, the data storage associated with a user working system could be temporary data storage, used while a file or files are needed or actively being worked on or needed by the system or the user. For example, when files were not being worked on they could be moved to the storage system, (ie. copied to the storage system and deleted from the working system). Thus, except for a copy of the Master Template located in the working system, data not being used is not stored on the working system data storage device where it would be potentially subject to being infected, damaged, destroyed, hacked, or manipulated in some way.

Optional use With Web Sites

Optionally, the working system could support a web site, or a computer could contain more than one working system or more than one storage system that could support various functions. For example one working system could contain a web site, while another working system is used by a user.

Optionally, one or more NetLock devices (described in the Appendices) may be used and may automatically switched or enable/disable network connections as desired.

Optionally, one or more NetLock devices may be used to switch, enable, or disable connections to a working system as needed.

Optionally, use of web software could indicate to a controller that is associated with a Netlock Device and is process watching to enable a network connection to or from a working system, and quitting all network software (or lack of activity or other trigger) may indicate to a controller associated with the NetLock device to disable the network connection.

Optional Explanation of Automatic Backup or Archiving

Optionally, an automatic backup or archiving process may be associated with the storage system or the working system. Volatile or nonvolatile data may be saved, backed up or archived.

In one embodiment, external devices may be isolated and be used as storage systems. Alternatively, one or more external device(s) could also be isolated and used as one or more working systems. External ports can be connected to switches and switched, enabled, or disabled to connect to one or more isolated working systems, and then switched to connect to one or more isolated storage systems. Such switching may be done manually or automatically, or using a hardware switching process or a software switching process.

Optionally, in one embodiment, each time a save is made in a working system, a copy can be made to a storage system. Optionally, in order to prevent a virus or Trojan horse from causing havoc by performing millions of saves that get saved to the storage system, there could optionally be imposed a limit on frequency that a file could be saved, or other limitations could be placed on the process of saving data to the working system. (Optionally this could be part of the ROM or StoreExecute program.)

Optionally a quarantine data storage device can be used, or one or more common data storage device(s). Optionally, such data storage device can be accessed by the working system, or by the storage system, or by another logic control device that may also have access to the working system or storage system.

Optionally, a storage system may utilize one or more data storage devices. A working system can utilize one or more data storage devices. A working system and storage system can share a data storage device if they are isolated from each other. For example, a data storage device could be partitioned into two or more partitions, for example: Partition A and Partition B.

Optionally, working system "A" could consist of an isolated computing process associated with an isolated data storage partition located on partition "A". Storage system "B" could consist of an isolated computing process associated with an isolated data storage partition located on partition "B". Partitions can be isolated in a manner similar to how data storage devices can be isolated. Control over the partitions could optionally rely up an isolated computing process "C".

Optionally, applications and programs stored in the isolated working system can be repaired on command or automatically as needed. Optionally, a comparison process between a master template and the application/software in use could be used as a basis for how the application/software should look, and if different, components could be replaced as needed.

Optionally, a separate processor that has restricted functionality may be used to process data in the isolated working system, or the main processor can be given a restricted functionality. This can be done with multiple data storage devices, or one data storage device that has isolated partitions.

Optionally, the ability to execute files (located on a nonvolatile data storage device associated with a working system) may be enabled/disabled as needed. For example, logic control software may not contain code needed to execute files located on a nonvolatile data storage device associated with a storage system, or code needed to execute files can be disabled/enabled or switched on/off as needed.

Optionally, the logic control software associated with the storage system may be set to read only, or inaccessible from the working system or storage system (so that malicious code can not effect the software nor the processor nor gain access to the storage system). Optionally, a third isolated logic control and computing processes may be used to access that code. A logic control and computing processes may be performed via separate logic control and processing devices, or be on a single device that has the ability to isolate two or more logic control processes.

Optionally, data that is copied from the volatile or nonvolatile data storage device(s) associated with the working system to the storage system can be deleted from the working system and associated data storage devices as needed. This may help to prevent hacking, etc.

Optionally, working system(s) or their associated Data Storage Devices, and storage system(s) or their associated Data Storage Devices, need not be on a computing device together. They can be on a network, external, have wireless connections, or be anywhere. For example, a computing device may have a working system, in which an associated nonvolatile data storage device is in a nearby server; and a storage system may be located over a network, and associated with an external wireless data storage device.

Optionally, a working system may not have an associated non-volatile data storage device. A working system could be limited to volatile storage. Additionally, a working system may have a plurality of processing functions or processors associated with it.

In one embodiment a switching process that may be controlled by the control system that may be used to switch which system(s) have access to network communication. Network communication can be dedicated to a particular working system/or storage system, or switched as needed.

Optional Shells

Optionally, using a variation of the Shell approach, isolated shells may operate as working systems optionally with associated data storage, and other isolated shells can operate as storage systems optionally with associated data storage. Data may be copied to and from to the working system and storage system shells associated volatile or nonvolatile memory using a copy process that prevents the execution of data.

Optional Changes to Software

Optionally, in order to enhance the effectiveness of the isolated working system & storage system embodiments described above, the following changes may be made to software. Data used by the software may be kept in a storage system until needed. Data can be broken up and only data pulled from the working system that is needed. For example, instead of treating an e-mail in box as one file, e-mail programs can be modified to treat them as separate files, and only copy specific file(s) into or out of the working system as needed, keeping all of the other data isolated. Alternatively, data could be stored in the working system as one or more files, but when for example a specific e-mail was needed, only that specific e-mail part of a file could be copied to the working system, and data could be saved from the working system into that one file in the storage system.

E-mail was used here as an example. Optionally, software, and especially software used for the web, may use the approach of storing records as individual files, or keeping them in one or more files and only bringing the data into the working system that is needed at that time or is likely to be needed.

Optionally, when a Netlock device enables internet connection e-mail and other software used on the web that is currently in the working system may be limited to only data that needs to be sent or used, limiting a hackers ability to access any other data. During web commerce sessions, data can be frequently moved to and from the storage system as needed to ensure that the least possible, preferably only that data required and in use or needed for use is in the working system.

Optionally, an index or database containing content of some data or files contained in the storage system may be moved to or located in the working system. When such data is selected to use or open, it could then be copied into the working system as needed and copied back to the storage system when not needed, and deleted from the working system.

Optionally, switching data storage device identity may be done using software that interacts with the data storage device or data storage device controller. Such software could be isolated from the working system and storage system. For example it could be part of an isolated StoreExecute that conducts the repair process, or it could be on it's own isolated StoreExecute. This may necessitate a change in some data storage device controllers to enable them to accept software commands to change identity/boot sequence.

Optionally, a data storage device may be hot swappable, and turned on only as necessary during the isolated backup event.

Optional Netlock

Optionally, the netlock device may be controlled by any type of logic control device, triggered automatically or manually, by a hardware or software process. Switch trigger may include or utilize a timer/scheduler. It may also include any method of triggering a switching process. For example, a coin operated mechanism or pin card operated mechanism could be used that triggers netlock. A dual or multi-line version of netlock that can deal with more than one network connection (two or more network connections), in which case the netlock device may optionally be modular in nature to add additional network connections as needed.

Optionally, a dual or multi-line version of netlock that can deal with more than one network connection (two or more network connections), in which case the netlock device may optionally be modular in nature to add additional network connections as needed. If so desired the multi-line version could potentially controlled by one logic controller or switching process.

Optionally, a process hereinafter referred to as an Installer Watcher, may run in the background of a computer that can look for activity that appears to be an installer. If the user attempts to install software, the attempt at installation may be halted and a dialog could query the user as to whether the user is installing software. If so the Installer Watcher could walk the user through a process of installation or testing the software prior to updating a Master Template or during actual update of a Master Template.

Computer Having Disk Drives With Switched Power and/or Identifier

Figure 13:
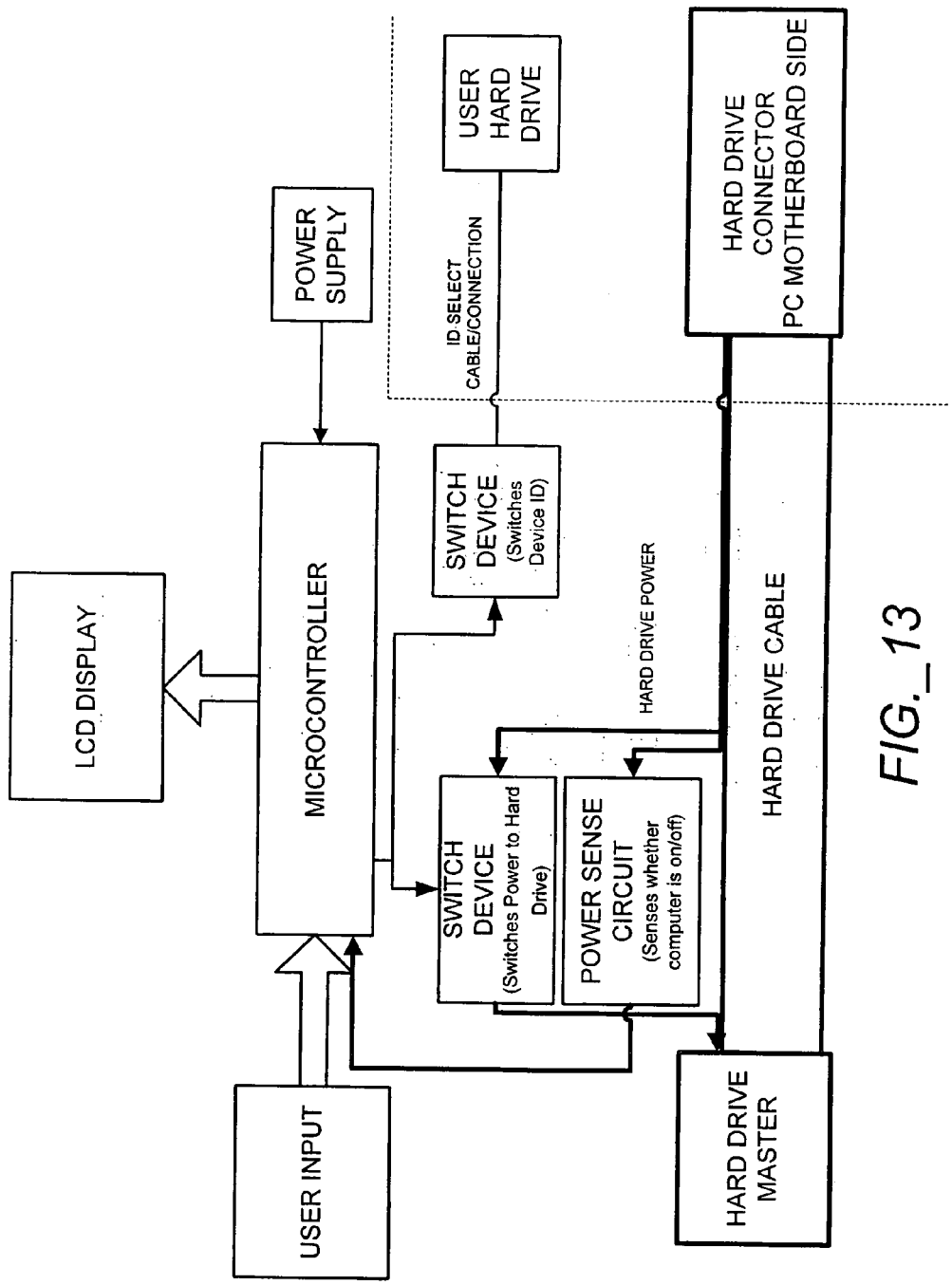
FIG. 13 is an illustration showing an embodiment of a computer having a plurality of hard disk drive storage devices and switches that provide or restrict power to the drives and/or modify a disk drive identifier to make available or hide selected ones of the hard disk drives.

FIG. 13 is an illustration showing an embodiment of a computer having a plurality of hard disk drive storage devices and switches that provide or restrict power to the drives and/or modify a disk drive identifier to make available or hide selected ones of the hard disk drives.

Additional Description

The inventions and methods described herein can be viewed as a whole, or as a number of separate inventions that can be used independently or mixed and matched as desired. All inventions, steps, processed, devices, and methods described herein can be mixed and matched as desired. All previously described features, functions, or inventions described herein or by reference may be mixed and matched as desired.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

Attached is a 209-page Appendix which is a part of this specification. The Appendix includes the following documents:

"Description of Self-Repairing System" (Text, 5 pages; Drawings, 4 Pages; Code, 5 Pages)

"Backup and/or Repair System—Multi-User System" (Text, 43 Pages)

Diagrams (Text, 18 Pages)

Table of Which Diagrams Go With Which Embodiments (Text, 1 Page)

Figures, S Series (Drawings, 20 Pages)

Figures, F Series (Drawings, 38 Pages)

Figures, W Series (Drawings, 32 Pages)

Figures, M Series (Drawings, 5 Pages)

Figures, E Series (Drawings, 17 Pages)

Figures, L Series (Drawings, 21 Pages)

What is claimed is:

1. A computer comprising:
a main computer hardware box;
a CPU disposed within the main computer hardware box;
a memory disposed within the main computer hardware box;
first and second controllers for respective first and second hard disk drive data storage devices disposed within the main computer hardware box;
a bus, communicatively coupling the CPU, memory and first and second controllers;
a switch, different from a computer on/off switch, communicatively coupled to the second hard disk drive data storage device, for altering the accessibility of the second data storage device to the CPU and exposed through the main computer hardware box or at a surface of the main computer hardware box for manipulation by a user; and
a power supply, for powering the CPU and the switch, wherein the power supply powering the switch when not powering the CPU.

2. A computer comprising:
a main computer hardware box;
a CPU disposed within the main computer hardware box;
a memory disposed within the main computer hardware box;
first and second controllers for respective first and second hard disk drive data storage devices disposed within the main computer hardware box;
a bus, communicatively coupling the CPU, memory and first and second controllers;
a switch, different from a computer on/off switch, communicatively coupled to the second hard disk drive data storage device, for altering the accessibility of the second data storage device to the CPU, the switch exposed through the main computer hardware box or at a surface of the main computer hardware box for manipulation by a user, the switch comprising at least one of:
(i) a switch for switching an identification setting of the second data store; and
(ii) a switch for providing power to the second data store even when power is not provided to the CPU; and
a power supply, for powering the CPU and the switch, wherein the power supply provides power to the switch even when not powering the CPU.

3. The computer of claim 2, wherein the second data storage device contains one of a backup template and a master template.

4. The computer of claim 2, wherein the switch is mechanical.

5. The computer of claim 2, wherein the switch is at least partially software.

6. The computer of claim 2, further comprising: an output device.

7. The computer of claim 6, wherein the output device comprises one from the set comprising a CRT, an LED, and an LCD.

8. The computer of claim 2, wherein the second data storage device comprises: a read-only data storage device.

9. The computer of claim 2, wherein the second data storage device comprises: an externally located data storage device.

10. The computer of claim 2, wherein the second data storage device comprises: a data storage device located over a network.

11. The computer of claim 2, wherein the second data storage device comprises: a data storage device co-located with the first data storage device.

12. The computer of claim 2, wherein the switch comprises: a controller for monitoring the first and second data storage devices to prevent damage to the first or second data storage device during switching.

13. A computer system comprising:
a main computer hardware box;
a processor and a memory disposed within the main computer hardware box;
a plurality of bootable data stores;
at least one bus, communicatively coupling the processor, the memory, and the physical data store switch for altering the identification of the bootable data stores to the processor, the physical data store switch exposed through the main computer hardware box or at a surface of the main computer hardware box for manipulation by a user;
a boot data store selected from the plurality of bootable data stores for booting the computer system; and
a physical data store switch, different from a computer on/off switch or keyboard key, coupled with the plurality of bootable data stores for altering the accessibility of the bootable data stores and identifying the bootable data stores and identifying the boot drive; and
the physical data store switch comprising at least one of:
(i) a physical data store switch for switching an identification setting of the bootable data stores and identifying the boot drive; and (ii) a switch for switching power to the bootable data stores even when power is not provided to the CPU
a power supply, for powering the CPU and the switch, wherein the power supply powering the switch when not powering the CPU.

14. A method for operating a computer, the method comprising:
providing a CPU, a memory, and first and second controllers for respective first and second hard disk drive data storage devices disposed at least partially within a main computer hardware box;
communicatively coupling the CPU, the memory, and the first and second controllers via a communications bus; and
communicatively coupling a switch, different from a computer on/off switch, to the second hard disk drive data storage device, to permit altering the accessibility of the second data storage device to the CPU, and exposing at least a portion of the switch through the main computer hardware box or at a surface of the main computer hardware box for manipulation by a user;
powering the CPU and the switch with a power supply, the power supply powering the switch when not powering the CPU;
the switch being operative for switching at least one of: (i) an identification setting of the second data store, and (ii) providing power to the second data store even when power is not provided to the CPU.

15. A method for operating a computer as in claim 14, the method further comprising, receiving a switch state input from the switch and altering the accessibility of the second data store from accessible to inaccessible or from inaccessible to accessible in response thereto.

16. A computer comprising:
a CPU disposed within a main computer hardware box;
a memory disposed within the main computer hardware box;

first and second controllers for respective first and second hard disk drive data storage devices disposed within the main computer hardware box;

a bus, communicatively coupling the CPU, memory and first and second controllers;

a switch, different from a computer on/off switch, communicatively coupled to the second hard disk drive data storage device, for altering the accessibility of the second data storage device to the CPU even when power is not provided to the CPU, the switch exposed through the main computer hardware box or at a surface of the main computer hardware box for manipulation by a user; and a power supply, for powering the CPU and the switch, wherein the power supply provides power to the switch even when not powering the CPU.

* * * * *